US008384936B2

(12) United States Patent
Isshiki

(10) Patent No.: US 8,384,936 B2
(45) Date of Patent: Feb. 26, 2013

(54) SYSTEM WHICH PERFORMS RESOLUTION-DEPENDENT VECTORIZATION OF PRINT DATA

(75) Inventor: Naohiro Isshiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 12/494,075

(22) Filed: Jun. 29, 2009

(65) Prior Publication Data

US 2010/0002257 A1    Jan. 7, 2010

(30) Foreign Application Priority Data

Jul. 2, 2008 (JP) ................................. 2008-173343

(51) Int. Cl.
*G06F 3/12* (2006.01)
(52) U.S. Cl. ......... 358/1.15; 101/484; 358/1.2; 358/1.9; 358/1.13; 358/1.18; 715/247; 382/190; 382/299
(58) Field of Classification Search ................. 358/1.15, 358/1.1, 1.2, 1.9, 1.13, 1.18, 471; 101/484; 370/254; 382/100, 181, 190, 299; 709/220; 715/247

See application file for complete search history.

(56) References Cited

U.S. PATENT DOCUMENTS

| | | | | |
|---|---|---|---|---|
| 5,392,133 A * | 2/1995 | Nakajima | ...................... | 358/407 |
| 6,025,927 A * | 2/2000 | Honma | ........................ | 358/1.18 |
| 6,049,394 A * | 4/2000 | Fukushima | .................... | 358/1.9 |
| 6,411,398 B1 * | 6/2002 | Inamine | ......................... | 358/1.2 |
| 7,050,183 B2 | 5/2006 | Isshiki | | |
| 7,342,676 B2 | 3/2008 | Isshiki | | |
| 2002/0186382 A1 * | 12/2002 | Gonzalez et al. | .............. | 358/1.2 |
| 2003/0117648 A1 * | 6/2003 | Akiyama et al. | ............. | 358/1.15 |
| 2003/0218762 A1 * | 11/2003 | Edwards et al. | ............... | 358/1.2 |
| 2004/0046972 A1 * | 3/2004 | Shibao | ............................ | 358/1.1 |
| 2004/0207859 A1 * | 10/2004 | Kadoi et al. | .................... | 358/1.1 |
| 2005/0276519 A1 * | 12/2005 | Kitora et al. | ................... | 382/305 |
| 2006/0007481 A1 * | 1/2006 | Kato et al. | .................... | 358/1.15 |
| 2006/0092467 A1 * | 5/2006 | Dumitrescu et al. | ......... | 358/1.15 |
| 2007/0019234 A1 * | 1/2007 | Yamaguchi | .................... | 358/1.15 |
| 2007/0024897 A1 * | 2/2007 | Moore et al. | ................. | 358/1.15 |

FOREIGN PATENT DOCUMENTS

JP          2006023942 A         1/2006

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

Even when vector data contains resolution dependent data, the vector data is generated at a resolution of quality without deterioration even if the vector data is output from any device on a network. When spooling the vector data, an MFP 1, receiving PDL data containing resolution information on a data processing resolution from a PC 2, analyzes the resolution information, and determines a processing resolution used at a time when an image forming device executes resolution dependent processing. After that, when the resolution dependent processing is necessary to generate the vector data, the MFP 1 executes the resolution dependent processing in accordance with the determined processing resolution.

5 Claims, 28 Drawing Sheets

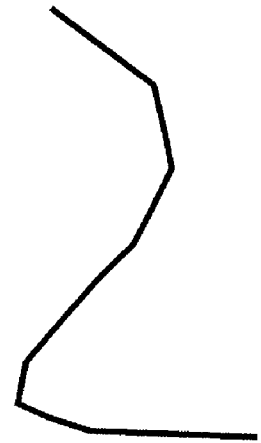
FIG.5C LINEARIZE AT 600 DPI TARGET
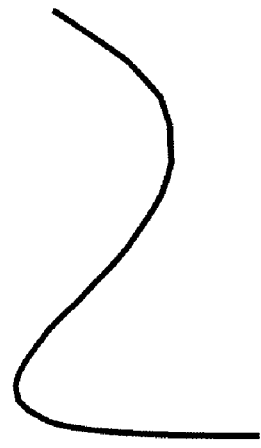
FIG.5B LINEARIZE AT 1200 DPI TARGET
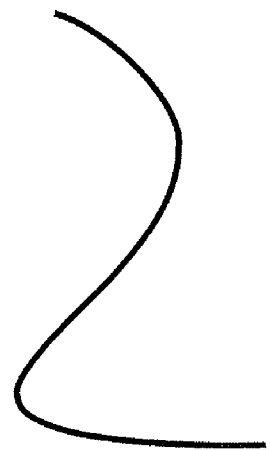
FIG.5A BEZIER CURVE

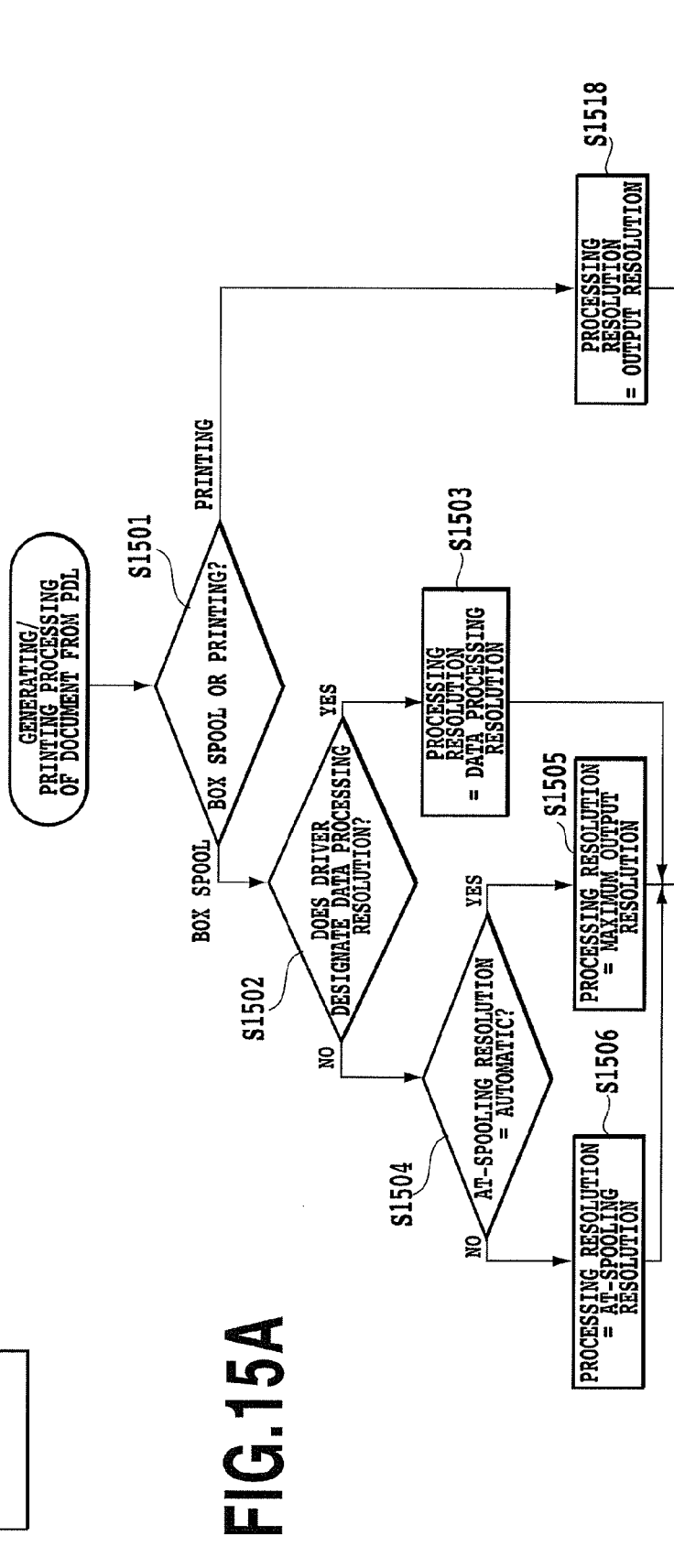

2601

| DETAILED INFORMATION | |
|---|---|
| ■ RECEIPT NUMBER | 00012 |
| ■ RECEIPT TIME | 2007/10/10　　12:45:10 |
| ■ DOCUMENT NAME | REPORT 1 |
| ■ DOCUMENT TYPE | PDL(PowerPoint) |
| ■ USER NAME | USER_A |
| ■ PAGE NUMBER | 10 |
| ■ AT-SPOOLING DESIGNATED RESOLUTION | 2400dpi |

CLOSE

FIG.26

SYSTEM WHICH PERFORMS RESOLUTION-DEPENDENT VECTORIZATION OF PRINT DATA

BACKGROUND OF THE INVENTION

1. Field of the Invention

The present invention relates to a multifunction printing device which is to be connected to a network and has functions of an input/output device like a printer and scanning functions, and to an image forming system composed of the device.

2. Description of Related Art

Recently, a lot of image input/output devices such as image scanners, digital multifunction machines and printers have come to be connected to a network. By using such an environment, a technology has been developed conventionally which copies images by outputting images, which are input with an image input device A, from an output device B on the network.

A function of making a copy by performing image input/output with the same device is called "local copy", and a function of making a copy by performing image input/output with different devices on the network is referred to as "remote copy".

The remote copy constitutes a base of the following techniques:

[i] Cluster copy that performs, when making a large number of copies, simultaneous print outputs by transferring images read with a single input device to a plurality of output devices; and

[ii] Proxy printing that outputs, when the printing device is in use for PDL printing or the like in a multifunction machine and the copying function of the multifunction machine cannot be used, to another single printer on the network using only the scanner function.

Using the functions of the remote copy, cluster copy and proxy printing makes it possible to consider all the individual input/output devices connected to the network as a single system as a whole, and to improve the productivity of the system in its entirety.

On the other hand, the original remote copy has the following problems because it converts images input with the input device into compressed bitmap data and transmits to the output device:

[1] Since the input device and output device have different color reproduction characteristics, color feeling varies depending on the output device.

[2] When the output device has a resolution (output resolution) higher than the input device, the output device cannot fulfill its performance.

[3] Images can be altered depending on the output device because of the difference in engine characteristics such as thin line reproducibility of the output device (for example, images input with the multifunction machine have been subjected to image processing assuming local printing).

[4] Because of the great data size of the transfer images, it takes a lot of transfer time on the network, thereby reducing the productivity.

To solve the problems, a technique has been developed recently which converts input images to vector data by applying a vectorizing technique and transmits it (see Japanese Patent Laid-Open No. 2006-23942). In addition, a technique has also been developed which converts input images to device independent color space data (common color space data) by applying a color matching (color conversion) technique and transmits it.

By converting the color space of the image data to the device independent color space on the input device side, and then by converting it to the output device dependent color space on the output device side again, the color matching between the input device and output device is made, and thus the foregoing problem [1] is solved.

In addition, vectorizing the bitmap data and transferring the vectorized bitmap data, and rasterizing the vector data received at the output device side in order to output rasterized vector data after converting to the bitmap image matching the output device will:

(a) Enable increasing the resolution up to the resolution of output device with less image deterioration, even if the input device has a resolution (data processing resolution) lower than the output device;

(b) Enable conversion considering the engine characteristics of the output device at a time of the rasterizing processing; and (c) Reduce the data size as compared with the bitmap data, thereby being able to solve the foregoing problems [2], [3] and [4].

Accordingly, high image quality print output can be obtained regardless of the types of the input/output devices.

(First Problem)

On the other hand, when generating vector data by inputting PDL data, there are some cases where part of the vector data generated includes resolution dependent data according to the installation method of an application, printer driver and PDL interpreter. Thus, as for the generated vector data, which designates a low resolution device (output device) as a target, there are some cases where it includes resolution dependent low resolution data. In this case, it is impossible to obtain high definition (high resolution) print output, even if the vector data is output with a high resolution device (output device).

The following shows an example of the resolution dependent vector data.

(Linearization Processing)

When the vector data contained in the application data or PDL includes a curve, linearization processing is applied. In the linearization processing, resolution dependent processing is carried out in optimization processing after completing a linearization decision and linearization processing. Thus, the vector data after the linearization processing includes resolution dependent data.

The following shows an example of a conventional linearization processing.

A curve contained in the vector data is often a Bezier cubic curve. FIG. 1 shows an example of the linearization processing of a Bezier cubic curve.

FIG. 1 is a flowchart showing an example of the linearization processing of a Bezier cubic curve.

At S101, an input device divides a target Bezier cubic curve into two Bezier cubic curves.

As shown in FIG. 2, as for a Bezier cubic curve consisting of four control points C0, C1, C2 and C3, the Bezier cubic curve is divided into two Bezier cubic curves consisting of L0-L3 and R0-R3 obtained by the following equations:

$$T = \frac{C1 + C2}{2},$$

$$L0 = C0,$$

$$L1 = \frac{C0 + C1}{2},$$

$$L2 = \frac{L1 + T}{2},$$

$$L3 = \frac{L2 + R1}{2},$$

$$R0 = L3,$$

$$R1 = \frac{T + R2}{2},$$

$$R2 = \frac{C2 + C3}{2},$$

$$R3 = C3$$

At S102, the input device makes a decision as to whether each Bezier cubic curve obtained by the division at S101 can be considered to be a linear curve (a straight line) or not.

The flowchart of FIG. 3 shows an example of a linearization decision algorithm.

As shown in FIG. 4, assume that the control points of the target Bezier cubic curve of the linearization decision are C0, C1, C2 and C3. Then assume that the vector from C0 to C3 is a vector d, the vector from C0 to C1 is a vector V1, and the vector from C3 to C2 is a vector V2.

In addition, assume that the x component of the vector V1 with respect to the vector d is V1x, and the y component thereof is V1y. Furthermore, assume that the x component of the vector V2 with respect to the vector d is V2x, and the y component thereof is V2y.

Besides, the magnitude of each vector is represented by | | such as |d| represents the magnitude of the vector d.

At S201, the input device compares |d| with predetermined flatness (threshold), and proceeds to S202 if |d| is less than the flatness, and to S203 if |d| is greater than the flatness.

At S202, the input device compares |V1| and |V2| with the flatness, and if both |V1| and |V2| are less than the flatness, it makes a decision that the linearization decision result is TRUE, that is, that the target Bezier cubic curve is a linear curve, and completes the processing. If |V1| or |V2| is equal to or greater than the flatness, it makes a decision that the linearization decision result is FALSE, that is, that the target Bezier cubic curve is a curve, and completes the processing.

At S203, the input device compares V1y and V2y with the flatness. As a result, if V1y or V2y is greater than the predetermined flatness (threshold), it makes a decision that the linearization decision result is FALSE and completes the processing. If both V1y and V2y are less than the flatness, it proceeds to S204.

At S204, the input device makes a decision by calculating (V1x−|d|) and (−V2x−|d|) as to whether the internal control points (C1 and C2), when they are mapped onto the vector d, fall outside or inside C0 and C3. If they fall inside, the input device makes the linearization decision result TRUE, and if they fall outside, it makes the linearization decision result FALSE, and completes the processing.

As for the flatness used in the linearization decision algorithm, since it is a value considering the resolution at rasterization, it becomes resolution dependent processing.

At S103, according to the decision result at S102, if the linearization decision result is TRUE, the input device proceeds to S104. On the other hand, if the linearization decision result is FALSE, it performs at S105 the linearization processing recursively on the Bezier cubic curve whose linearization decision result is FALSE.

At S104, the input device adds a line connecting the control points C0 and C3 of the Bezier cubic curve, which is decided as a linear curve, as a linear curve segment.

FIGS. 5A-5C show examples of the curve having undergone the linearization processing.

FIG. 5A shows a Bezier curve before the linearization processing. FIG. 5B and FIG. 5C show vectorized data passing through the linearization processing assigning 1200 dpi as a rasterizing target and 600 dpi as a rasterizing target. As is found from FIG. 5B and FIG. 5C, since the number of division of the Bezier cubic curve varies in accordance with the target resolution, the number of the linear curve segments generated varies. Thus, the vector data generated by vectorizing the bitmap data comes to include the resolution dependent data.

(Font Selecting Processing)

As for font data, the data corresponding to the output resolution has been prepared. Accordingly, at font selection, data selection considering an output target device is carried out. In addition, the outline data of the font data includes curve components, and the foregoing linearization processing is also applied to the font scaling processing. Accordingly, the outline data obtained by applying the linearization processing to the text region also becomes resolution dependent data.

(Second Problem)

Furthermore, when generating completely resolution free vector data, that is, vector data considering rendering at any desired resolution, the optimization processing in accordance with the resolution is difficult. If the optimization processing is impossible, the number of objects contained in the vector data increases. This will bring about an increase in the data size, and reduction in the processing rate at the rasterization.

The present invention is implemented to solve the foregoing problems. The present invention provides to generate the vector data at a resolution that will cause little deterioration in quality even if the vector data includes resolution dependent data and is output from any devices on a network. The present invention also provides to make optimization of the vector data while keeping the quality of little deterioration even if it is output from any devices on the network.

SUMMARY OF THE INVENTION

An image forming system in accordance with the present invention including an image processing device for generating print data, and an image forming device which is connected to the image processing device via a network, and which is able to generate vector data from the print data to spool the vector data, wherein the image processing device comprises: an acquiring component configured to acquire a first processing resolution used for executing resolution dependent processing in the image processing device; a first processing component configured to execute resolution dependent processing in accordance with the acquired first processing resolution if the resolution dependent processing is necessary to generate the print data; a component configured to put resolution information about the acquired first processing resolution into the print data; and a transmitting component configured to transmit the print data containing the resolution information to the image forming device, and wherein the image forming device comprises: a receiving component configured to receive the print data transmitted from the transmitting component; a determining component configured to determine a second processing resolution at a time when the image forming device executes resolution dependent processing by analyzing the resolution information contained in the print data; and a second processing component configured to execute resolution dependent processing in accordance with the determined second processing resolution if the resolution dependent processing is necessary to generate the vector data.

In addition, an image forming device in accordance with the present invention is connected via a network to an image processing device for generating print data, and which is able to generate vector data from the print data to spool the vector data, the image forming device comprising: a receiving component configured to receive from the image processing device the print data containing resolution information used at a time when the image processing device executes resolution dependent processing; a determining component configured to determine a processing resolution used for the image forming device executing resolution dependent processing by analyzing the resolution information contained in the print data; and a processing component configured to execute resolution dependent processing in accordance with the determined processing resolution by the determining component if the resolution dependent processing is necessary to generate the vector data.

Furthermore, an image processing device in accordance with the present invention is connected to an image forming device capable of generating vector data from print data and spooling the vector data, and generates the print data, the image processing device comprising: an acquiring component configured to acquire a resolution used for executing resolution dependent processing in the image processing device; a processing component configured to execute resolution dependent processing in accordance with the acquired resolution if the resolution dependent processing is necessary to generate the print data; a component configured to put resolution information about the acquired resolution into the print data; and a transmitting component configured to transmit the print data containing the resolution information to the image forming device.

According to the present invention, even if the vector data contains the resolution dependent data, any image forming device on the network can output the vector data generated at the resolution of quality with little deterioration. As a result, even if the vector data includes the resolution dependent data, quality equivalent to the resolution independent vector data can be obtained.

In addition, even when the vector data is output from any image forming device on the network, the vector data can be optimized while maintaining the quality with little deterioration.

Further features of the present invention will become apparent from the following description of exemplary embodiments (with reference to the attached drawings).

BRIEF DESCRIPTION OF THE DRAWINGS

FIG. 5A-FIG. 5C are diagrams showing examples of the conventional linearization processing in the problems of the present invention;

FIG. 15 is a diagram showing the relationship of FIGS. 15A and 15B;

FIGS. 15A and 15B area flowchart showing document generating/printing processing from a PDL in the embodiment in accordance with the present invention;

FIG. 26 is a diagram showing an example of a screen displaying details of box spooled document data in the embodiment in accordance with the present invention.

DESCRIPTION OF THE EMBODIMENTS

Figure 1:
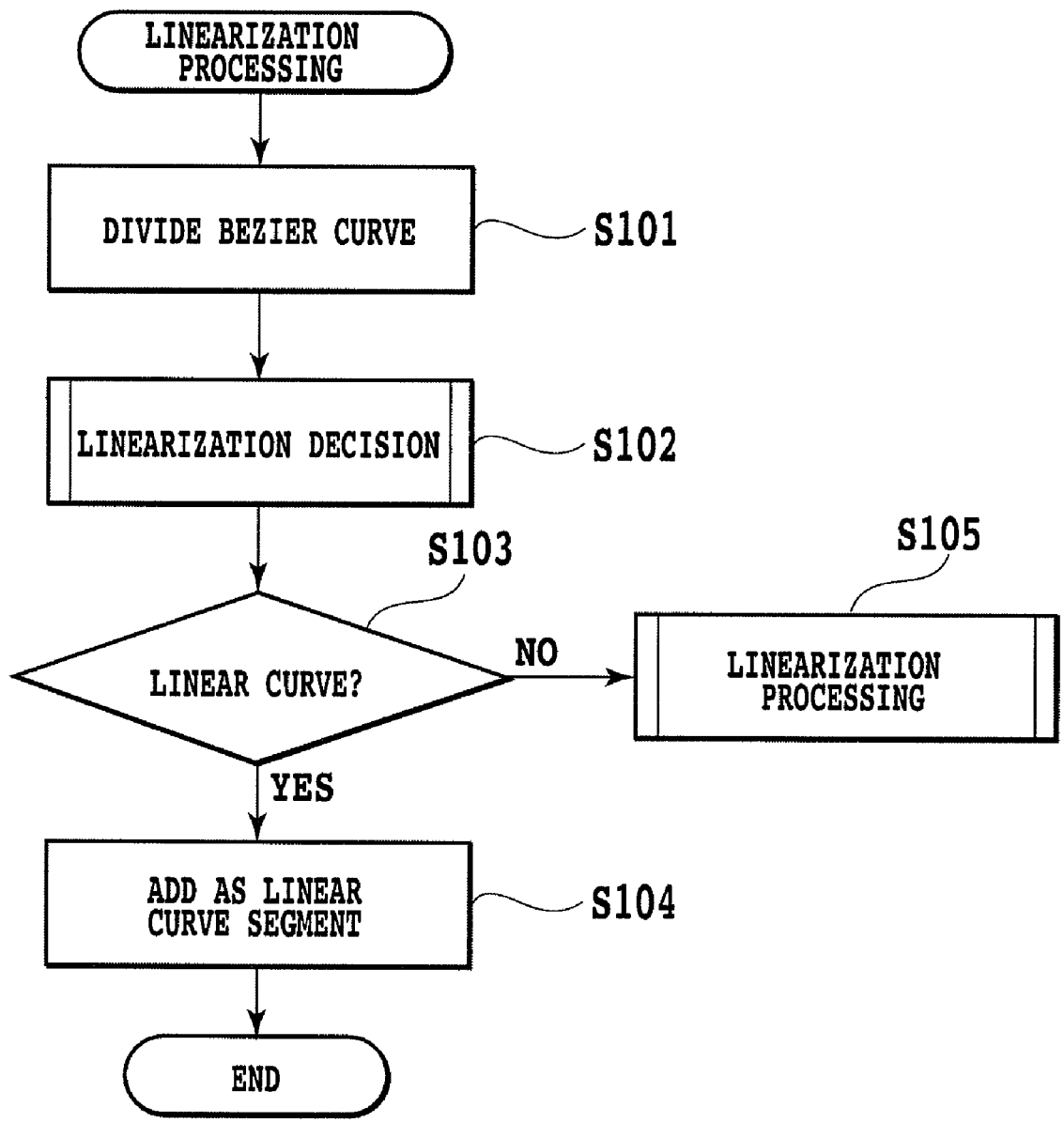
FIG. 1 is a flowchart showing an example of the conventional linearization processing in the problems of the present invention.
Figure 2:
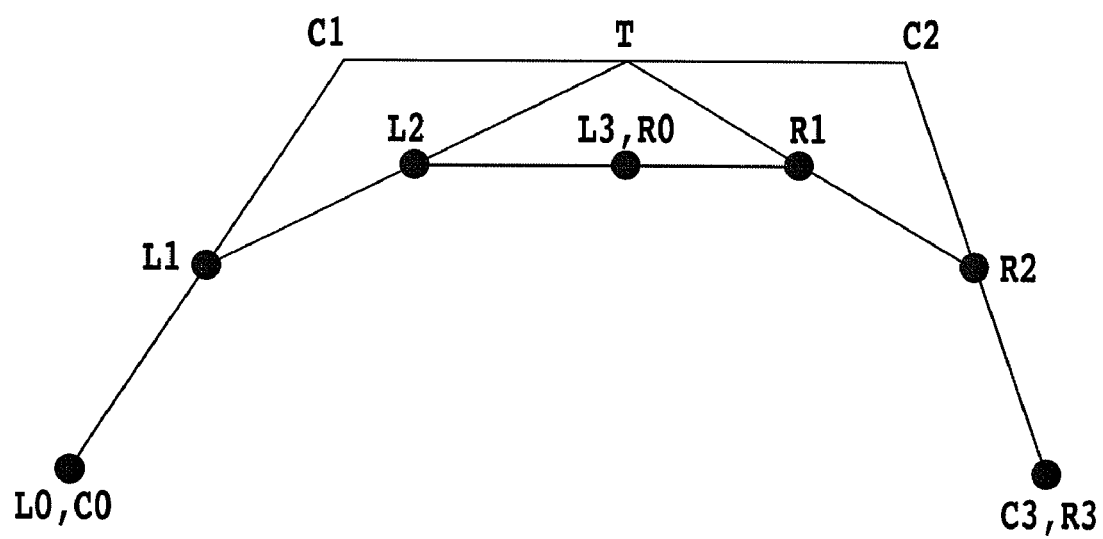
FIG. 2 is a diagram illustrating division of a conventional Bezier cubic curve in the problems of the present invention.
Figure 3:
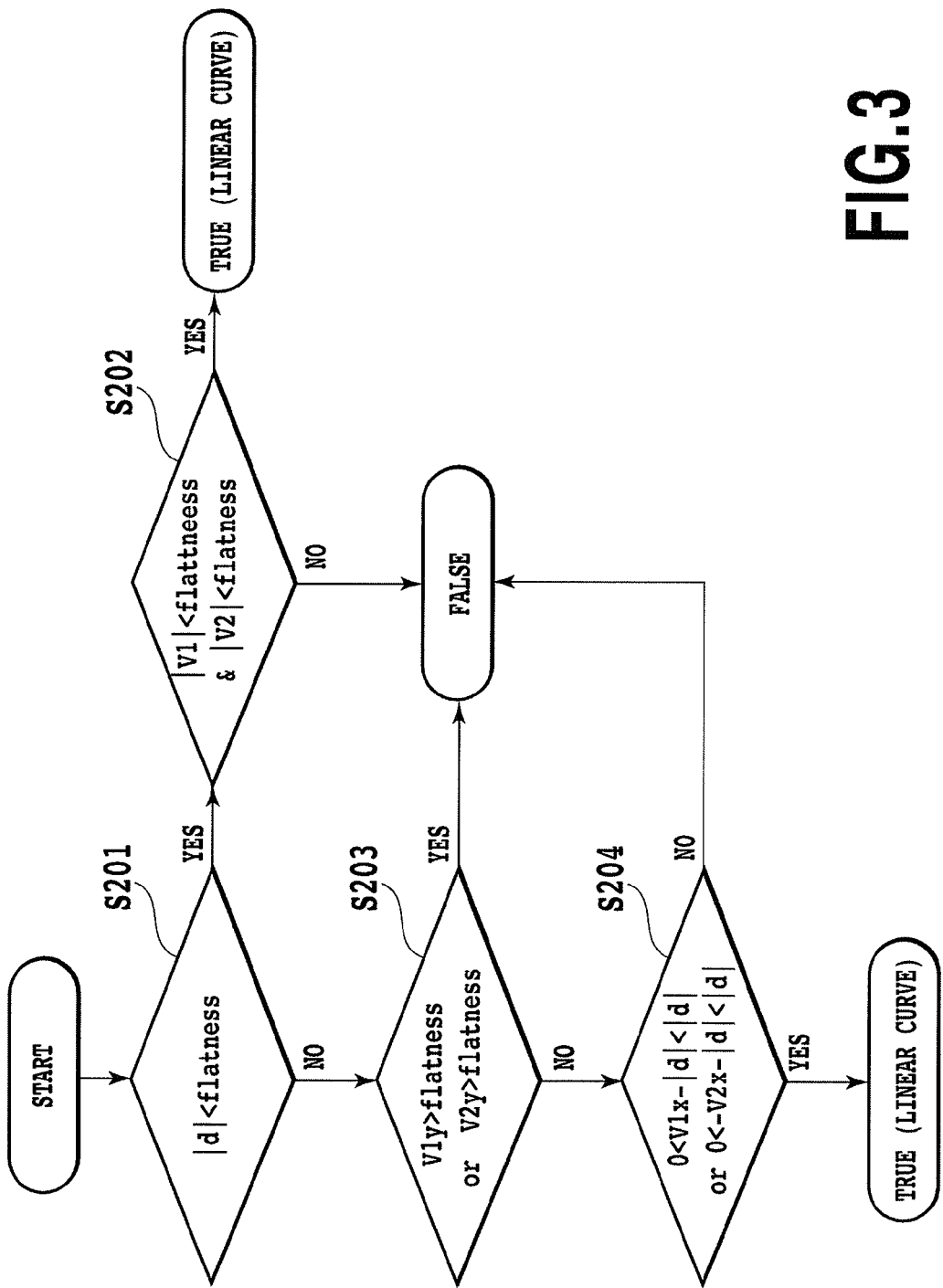
FIG. 3 is a flowchart showing an example of a conventional linearization decision algorithm in the problems of the present invention.
Figure 4:
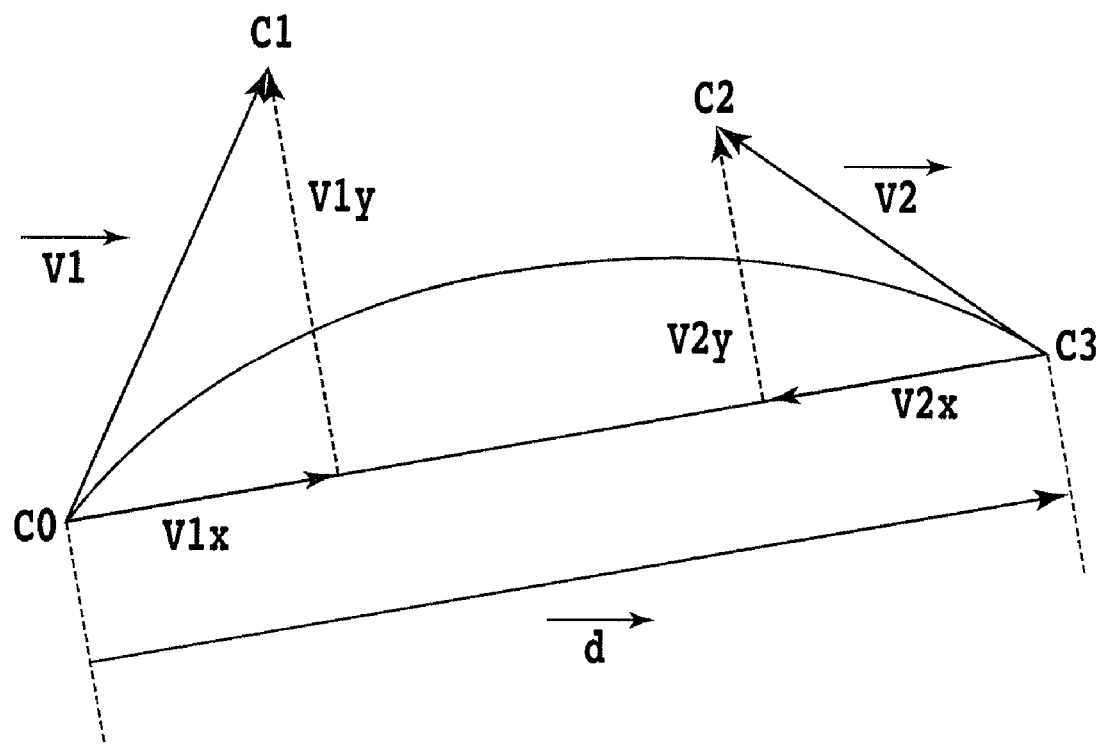
FIG. 4 is a diagram illustrating the conventional linearization decision algorithm in the problems of the present invention.

The embodiments in accordance with the present invention will now be described with reference to the accompanying drawings. Incidentally, in the drawings described below, components having the same functions are indicated by the same reference numerals, and their redundant explanation will be avoided.

What is important in the embodiments in accordance with the present invention is, even if vector data output from an input device connected to a network includes resolution dependent data, to output the vector data after reducing deterioration by an output device connected to the network. As an example of the input device, there is an image processing device such as a control unit of a PC, multifunction machine, printer, scanner or the like. In addition, as an example of the output device, there is an image forming device of a multi-function machine, printer or the like.

An example of such a system will be described below.

First Embodiment

System Configuration

Figure 6:
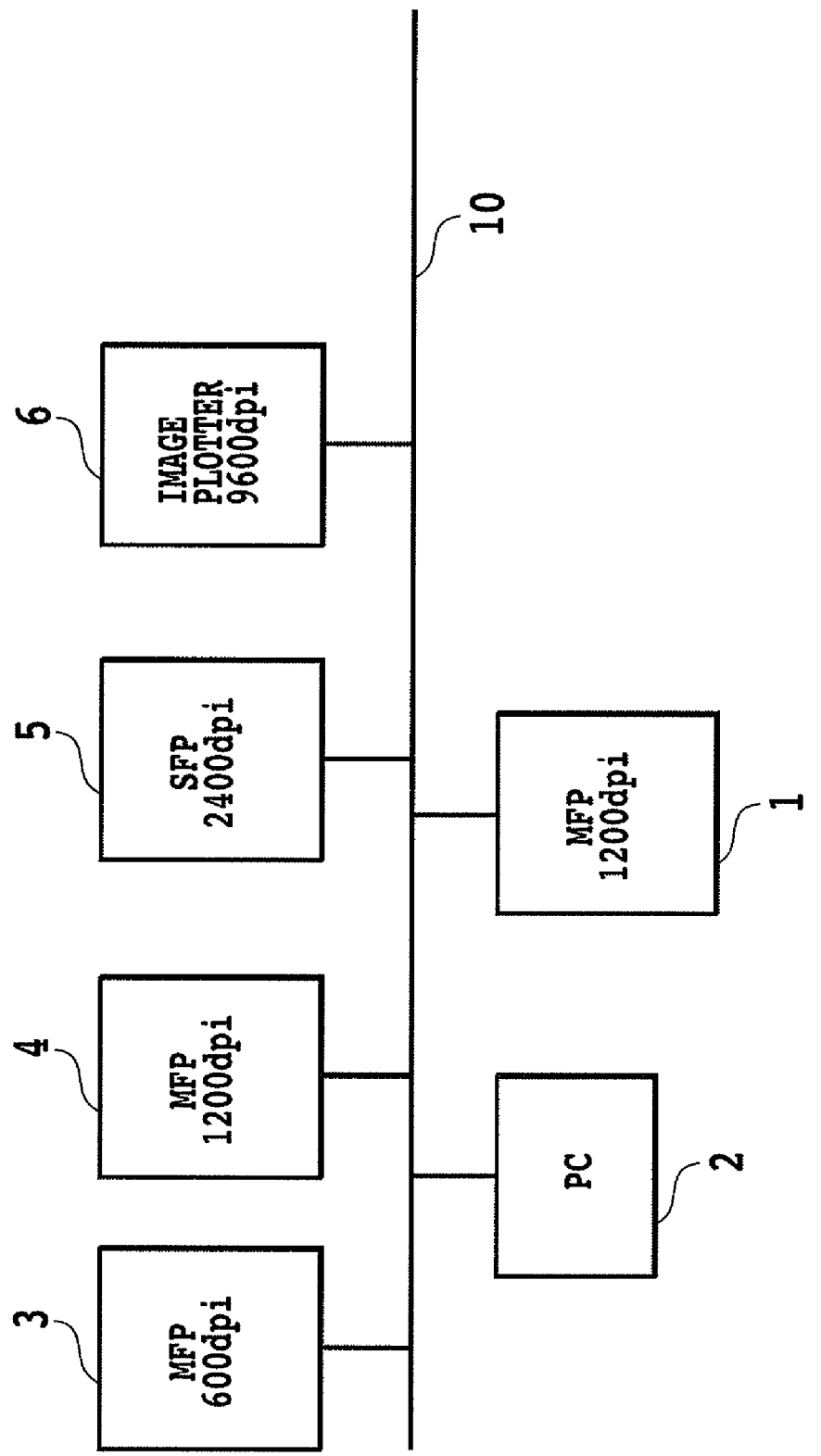
FIG. 6 is a block diagram showing a whole configuration of an image processing system of an embodiment in accordance with the present invention.

FIG. 6 is a block diagram showing a whole configuration of an image processing system of the present embodiment.

In FIG. 6, the image processing system includes a LAN 10, a PC 2, an MFP 1 and 4 capable of 1200 dpi output, an MFP 3 capable of 600 dpi output, an SFP 5 capable of 2400 dpi output, and an image plotter 6 capable of 9600 dpi output. The individual components are interconnected via the LAN 10.

In the following, as an example of the image forming device of the present embodiment, a configuration of the MFP 1 will be described. The MFP 1 can spool vector data.
(Configuration of Controller Unit)

Figure 7:
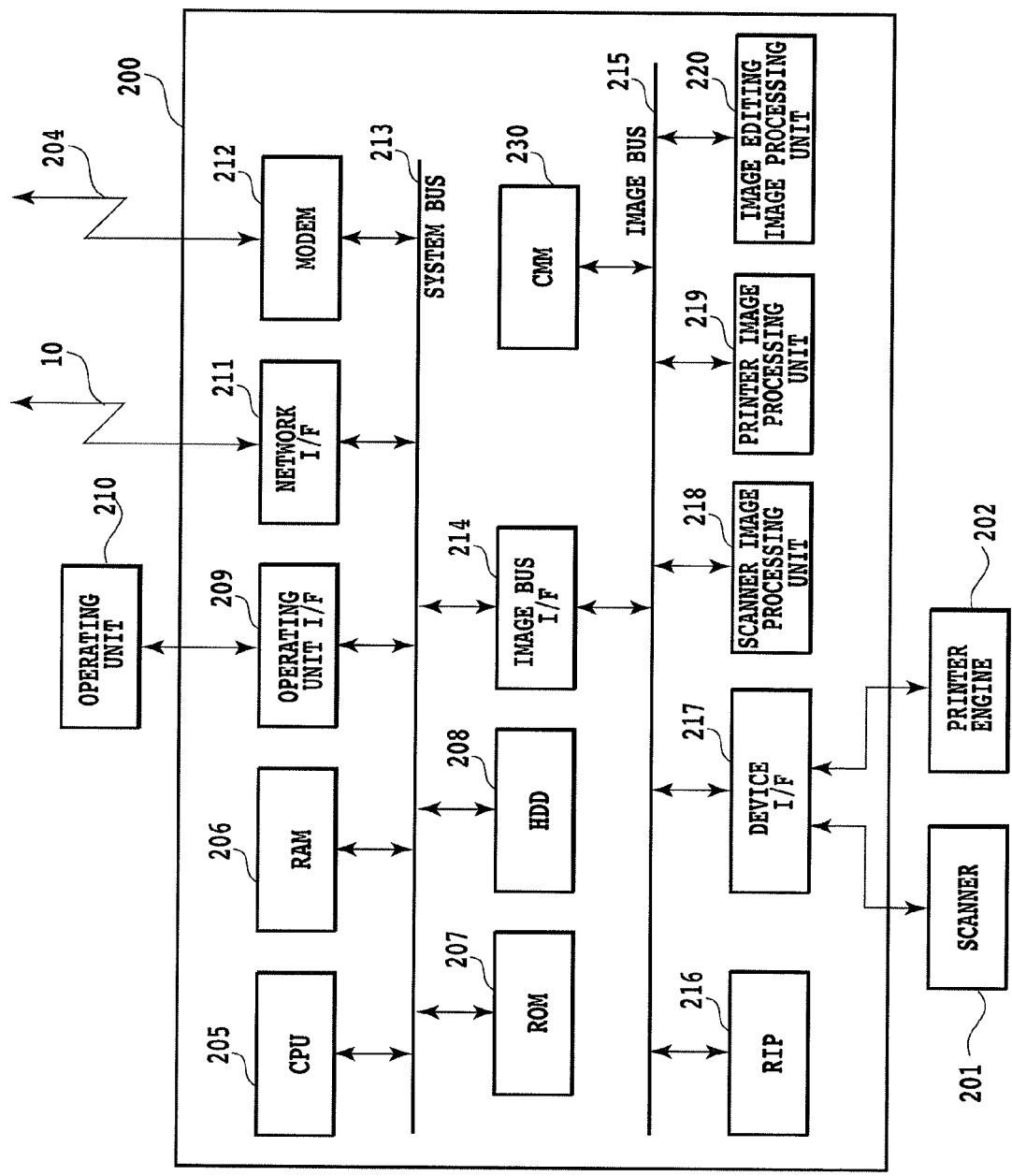
FIG. 7 is a block diagram showing a configuration example of a control unit of an image forming device of the embodiment in accordance with the present invention.

FIG. 7 is a block diagram showing a configuration example of a control unit (controller) of the MFP 1 in the image processing system of the present embodiment. In FIG. 7, the control unit 200 is connected to a scanner 201 serving as an image input device and to a printer engine 202 serving as an image output device, and carries out control for reading image data or for print output. The control unit 200 is a controller that is connected to the LAN 10 or a public network 204 to input/output image information or device information via the network.

In the control unit shown in FIG. 7, a CPU 205 is a central processing unit for controlling the whole system. A RAM 206 is a system working memory for the CPU 205 to operate, and is also an image memory for temporarily storing input image data. A ROM 207 is a boot ROM that stores a boot program of the system. An HDD 208 is a hard disk drive for storing system software for various processing, input image data and the like.

The CPU 205 collectively controls access to various devices under connection according to individual control programs of the embodiment in accordance with the present invention, which are stored in the ROM 207 or HDD 208. Besides, CPU 205 collectively controls various processing executed within the control unit 200 and various portions shown in FIG. 7.

In FIG. 7, an operating unit I/F 209, which is an interface unit with an operating unit 210 having a display screen capable of displaying image data and the like, outputs the image data to the operating unit 210. In addition, the operating unit I/F 209 plays a role of transferring the information input from an operator of the operating unit 210 (that is, a user of the image processing system) to the CPU 205. The operating unit 210 has an input operating unit including a keyboard or various switches for inputting prescribed instructions or data, and a display unit for performing a variety of displays such as an input/set state of the device. A network interface 211, which is implemented by a LAN card, for example, is connected to the LAN 10 and carries out input/output of information with an external device. A modem 212, which is connected to the public network 204, carries out input/output of information between modem 212 and the external device.

In the control unit 200 of the present embodiment, the foregoing devices are arranged on a system bus 213.

An image bus I/F 214, which is an interface for connecting the system bus 213 with an image bus 215 for transferring the image data at a high speed, is a bus bridge for converting a data structure. The image bus 215 can be composed of a PCI bus or IEEE 1394. Then, the image bus 215 is connected with devices such as an RIP 216, a device I/F 217, a scanner image processing unit 218, a printer image processing unit 219, an image editing image processing unit 220, and a color management module (CMM) 230, which will be described later.

A raster image processor (RIP) 216 develops PDL code or vector data, which will be described later, into an image. The device I/F 217 connects the scanner 201 or printer engine 202 with a control unit 200, and performs synchronous/asynchronous conversion of data.

The scanner image processing unit 218 performs various processing such as correction, work and editing on the input image data. The printer image processing unit 219 performs, on the printout image data, processing such as correction or resolution conversion of the printer. The image editing image processing 220 carries out various image processing such as rotation of the image data and compression and decompression processing of the image data. The CMM 230 is a dedicated hardware module for performing color conversion processing on the image data in accordance with profile or calibration data.

Incidentally, the MFP 3 and MFP 4 have the same configuration as the MFP 1, and the SFP 5 and image plotter 6 have the same configuration as that of FIG. 7 except for the scanner 201 and scanner image processing unit 218.
(Control Software Configuration)

Figure 8:
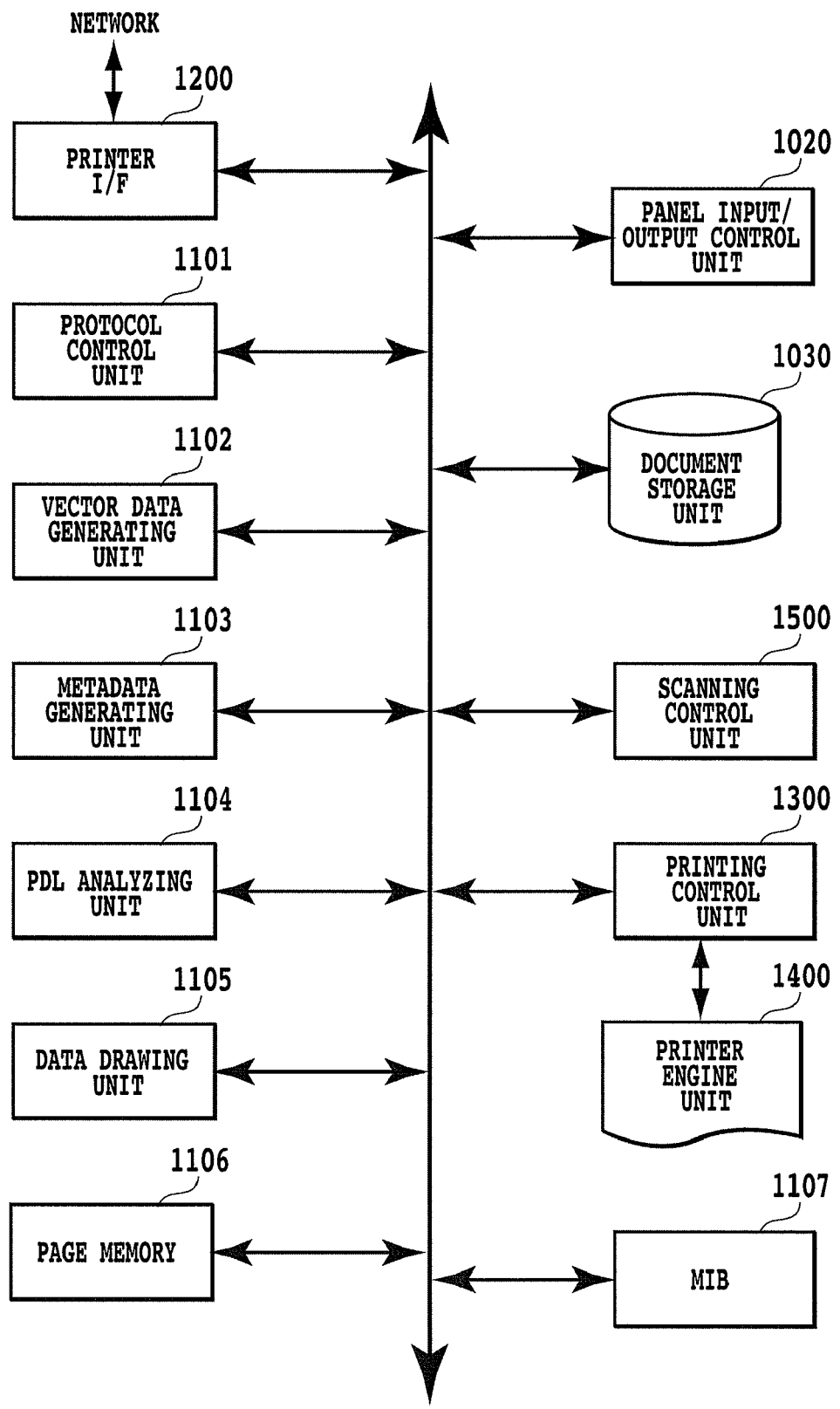
FIG. 8 is a block diagram showing an example of a configuration of control software in the embodiment in accordance with the present invention.

FIG. 8 is a block diagram showing a configuration of the control software for controlling the operation of the MFP 1.

A printer interface 1200 is a component for carrying out input/output between the control software and the outside. A protocol control unit 1101 is a component for carrying out communication with the outside by analyzing and transmitting a network protocol.

A vector data generating unit 1102 is a component for generating from a bitmap image, vector data (vectorizing) which is a drawing description independent of the resolution.

A metadata generating unit 1103 is a component for generating metadata from secondary information obtained in the process of vectorizing. The metadata is additional data for searching, which is unnecessary for drawing processing.

A PDL analyzing unit 1104 is a component for analyzing a PDL and for converting the PDL to an intermediate code (Display List (DL)) which will facilitate processing. The PDL analyzing unit 1104 can execute resolution dependent processing such as linearizing processing of a Bezier curve or font scaling. The PDL analyzing unit 1104 is assumed to be able to handle up to 19200 dpi in the present embodiment. The intermediate code generated in the PDL analyzing unit 1104 is delivered to a data drawing unit 1105 to be processed. The data drawing unit 1105 is a component for developing the intermediate code into bitmap data, and the bitmap data after development is successively drawn into a page memory 1106.

The page memory 1106 is a volatile memory for temporarily retaining the bitmap data to be developed by a renderer. The page memory 1106 also functions as an MIB (Management Information Base) for retaining device information for responding to an inquiry about device information from an external device. The MIB, a management database, includes resolution information (information about output resolution) on the MFP 1.

A panel input/output control unit 1020 is a component for controlling input from and output to the operating panel.

A document storage unit 1030 is a component for storing the vector data, Display List and metadata generated in a single data file on a job by job basis of the input document, and is realized by a secondary storage such as a hard disk. It is assumed here that the data file is referred to as a "document (or Document)" in the present embodiment.

A scanning control unit 1500 performs various processing such as correction, work and editing on the image data input from the scanner.

A printing control unit 1300 carries out conversion processing of the content of the page memory 1106 into a video signal, and performs image transfer to a printer engine unit 1400. The printer engine unit 1400 is a printing mechanical unit for forming a permanently visible image on recording paper from the received video signal.

(Resolution Information Acquiring Processing)

Processing for acquiring resolution information executed at a start of the MFP 1 will be described.

When being started, the MFP 1 makes an inquiry at individual external devices (MFP 3, MFP 4, SFP 5 and image plotter 6) serving as an image forming device connected to the LAN 10 about the device information according to an SNMP protocol. The individual devices on the LAN 10 receiving the inquiry notify the MFP 1 of the MIB information the individual devices retain.

The device information includes the resolution information (output resolution information) about the individual devices. Accordingly, the MFP 1 retains the received output resolution information about the individual devices on the RAM 206.

Although it is assumed in the present embodiment that the output resolution information about the external devices is acquired at the start, it is also possible to acquire the output resolution information regularly after the start. It is also possible to acquire the output resolution information when a connection of a new external device to the LAN 10 is detected.

(At-Spooling Resolution Setting Processing)

Among the box specification settings of the MFP 1 of the present embodiment, the "user set value priority" setting and "at-spooling resolution" setting will be described with reference to FIG. 22 and FIG. 23.

Figure 22:
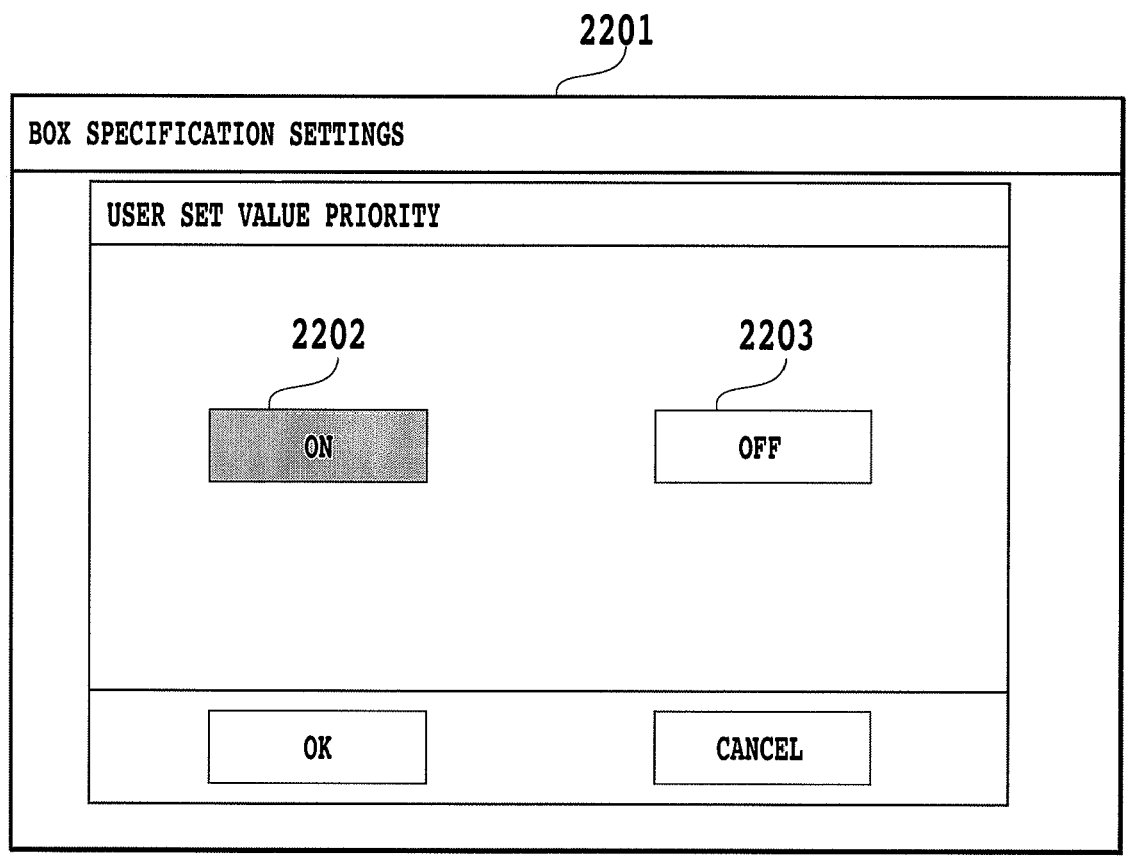
FIG. 22 is a diagram showing an example of a "user set value priority" setting screen in the embodiment in accordance with the present invention.

The reference numeral 2201 of FIG. 22 indicates an example of the setting screen displayed on the display unit of the operating unit 210 at a time of setting "user set value priority" in the box specification settings. A user can set "user set value priority" at "ON" or "OFF" by pushing a button 2202 or button 2203 on the screen 2201 via the operating unit 210.

The term "at-spooling resolution" refers to a resolution set as a processing resolution in the image forming device in the case where the image processing device does not designate the resolution in the image forming device when the image forming device spools the print data received from the image processing device. As an example without the designation of the resolution, there is a case where "automatic" is selected from a pull-down menu 2105 that will be described later. The at-spooling resolution is used to perform resolution dependent processing by spooling the print data input from another device, and is automatically set for printing/spooling as will be described later, or is set by a user. Accordingly, at-spooling resolution can differ from the output resolution.

The term "processing resolution" refers to a resolution used in the resolution dependent processing (such as linearization processing) the image forming device executes when performing the box spool or normal printing.

The term "output resolution" refers to a resolution normally used in an output device, and designates a resolution set in each output device. Accordingly, the output resolution is not limited to the greatest possible resolution of the device.

Figure 23:
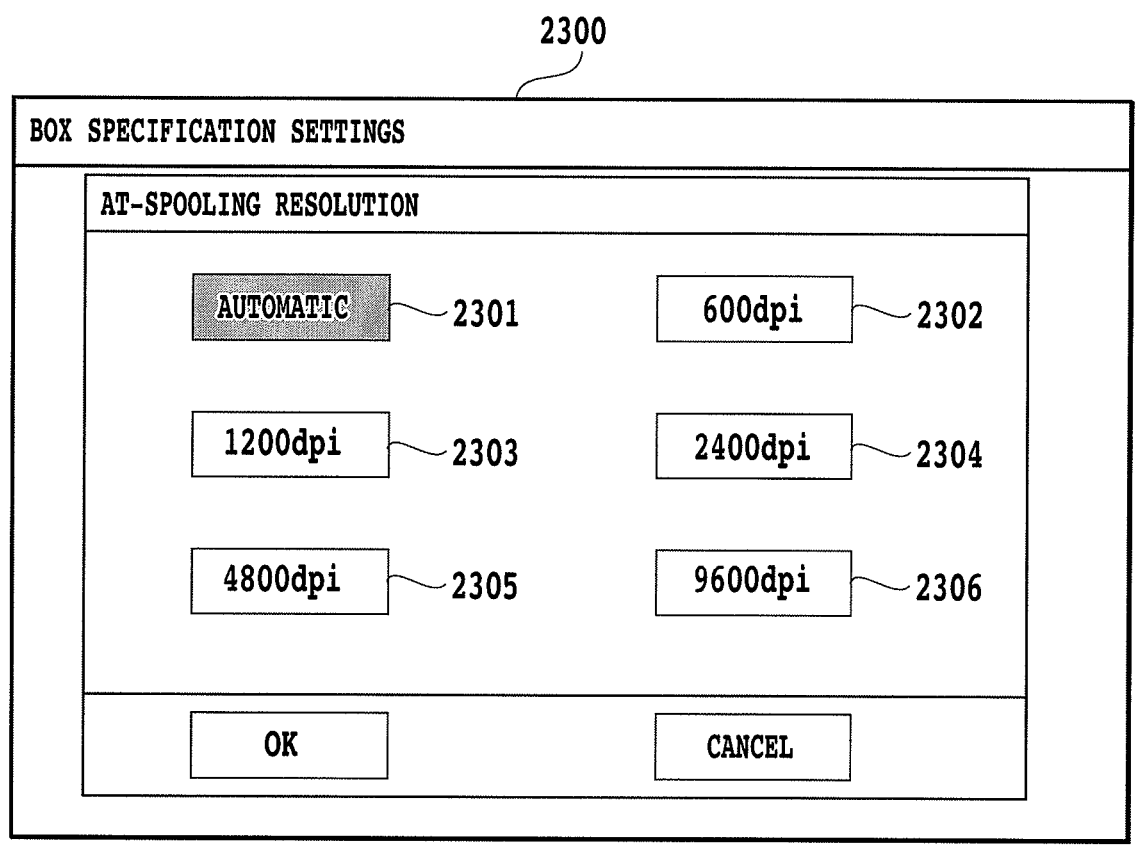
FIG. 23 is a diagram showing an example of a "spool resolution" setting screen in the embodiment in accordance with the present invention.

In FIG. 23, the reference numeral 2300 indicates an example of the setting screen displayed on the display unit of the operating unit 210 at a time of the "at-spooling resolution" setting among the box specification settings. The user can set the "at-spooling resolution" by pressing one of the buttons 2301-2306 on the screen 2301 via the operating unit 210. For example, when the user presses the button 2303 via the operating unit 210, the MFP 1 receives the user input, and sets the "at-spooling resolution" at 1200 dpi. Alternatively, the user can set the "at-spooling resolution" at "automatic" by pressing the button 2301 via the operating unit 210. Thus, when the user inputs information about the spool resolution via the operating unit 210, the MFP 1 sets the spool resolution in accordance with the user input.

The resolution selectable in the "at-spooling resolution" setting can be made dependent on the "user setting priority" setting. When the "user setting priority" setting is "ON", all the resolutions the PDL analyzing processing unit 1104 can deal with are displayed and one of them is selectable. The MFP 1 of the present embodiment can select one of the resolutions from 600 dpi to 19200 dpi. Thus, as seen from FIG. 6, since the output resolution of the MFP 1 is 1200 dpi, a resolution equal to or greater than the output resolution of the MFP 1 can be input.

On the other hand, when the "user setting priority" setting is "OFF", the MFP 1 can select up to the maximum resolution of the resolutions of the individual devices on the LAN 10, which are acquired in the resolution information acquiring processing. In the case of the system configuration of FIG. 6 in the present embodiment, as a resolution capable of being input, the resolution up to 9600 dpi, which is the resolution of the image plotter 6, can be set. Here, the RAM 206 retains the entire resolution information on the image forming devices connected to the network. Thus, the MFP 1 extracts the maximum resolution from the resolution information about the individual devices retained in the RAM 206, and limits the resolution capable of being input as the spool resolution to the maximum resolution extracted.

Accordingly, although it is possible, when the "user setting priority" setting is "ON", to set up to the maximum resolution the MFP 1 can handle regardless of the devices connected to the network, when it is "OFF", it is limited to the maximum output resolution of the devices on the network.

(PC Software Configuration)

The PC (Personal Computer) 2 has a CPU, central processing unit, for controlling the entire PC. The PC 2 also has a RAM which is a system working memory for the CPU of the PC 2 to operate and which is also an image memory for temporarily storing the input image data, and a ROM which stores the boot program of the system. Furthermore, the PC 2 has a hard disk for storing system software for various processing and input image data and the like. In addition, the PC 2 has an input operating unit including a keyboard or various switches for inputting prescribed instructions or data and a display unit for carrying out a variety of displays such as input/set state of the devices.

Figure 19:
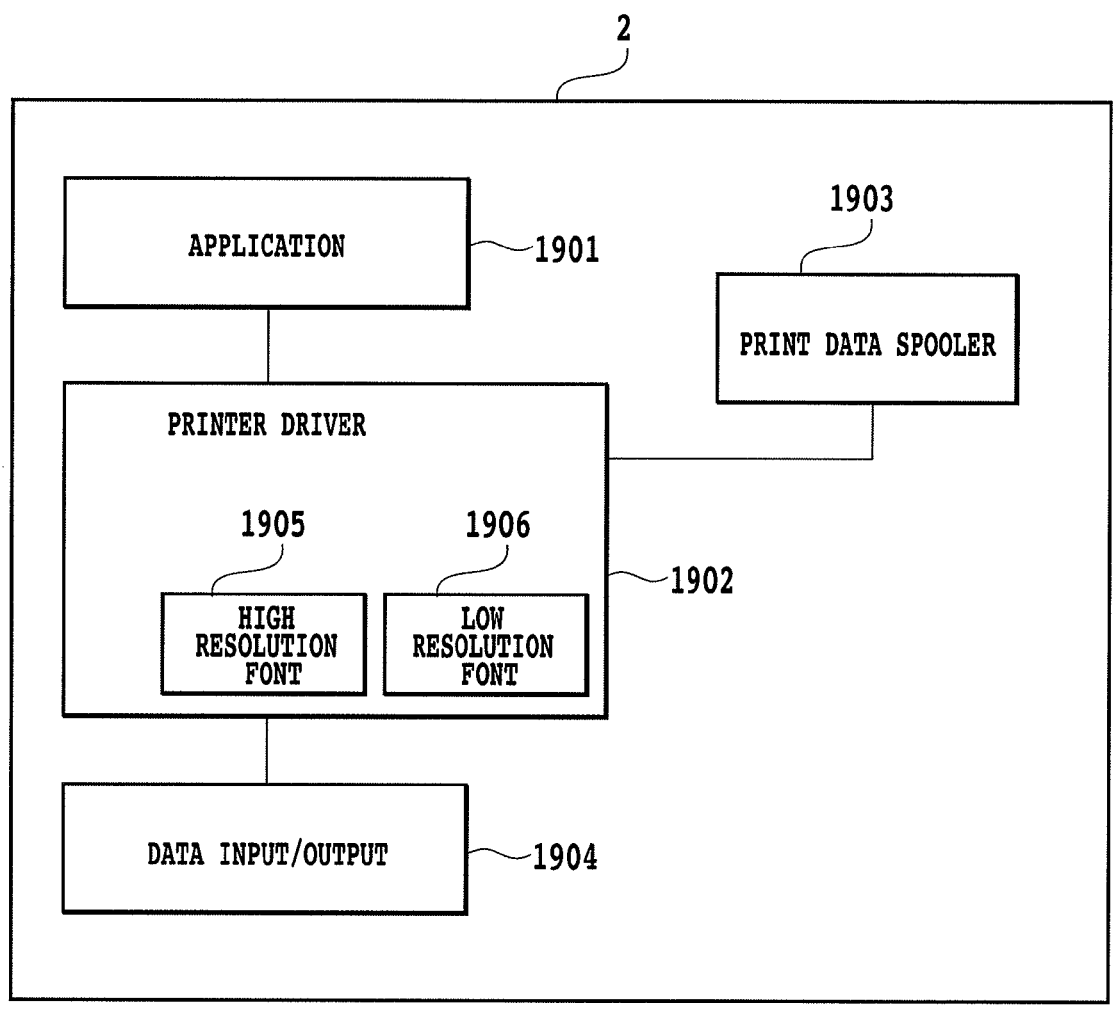
FIG. 19 is a configuration diagram of a software module on a PC in the embodiment in accordance with the present invention.

FIG. 19 is a configuration diagram of a software module on the PC 2 in accordance with the present invention.

The reference numeral 1901 indicates an application program operating on the PC 2. When printing from the application program, the PC 2 starts a printer driver 1902. The printer driver 1902 performs various filtering processing on the data the application program generates, and then generates print data (PDL data, for example), and spools the print data in the print data spooler 1903. Here, the printer driver 1902 retains within the printer driver a high resolution font 1905 and a low resolution font 1906, and selects a suitable font at a time of generating the print data. The spooled print data is transmitted via the data input/output unit 1904 to the printing device (image forming device) the user designates.

The data input/output unit 1904 not only transmits the print data, but also receives information from the printer and notifies the printer driver 1902 of it.

(Operation of Driver)

Figure 20:
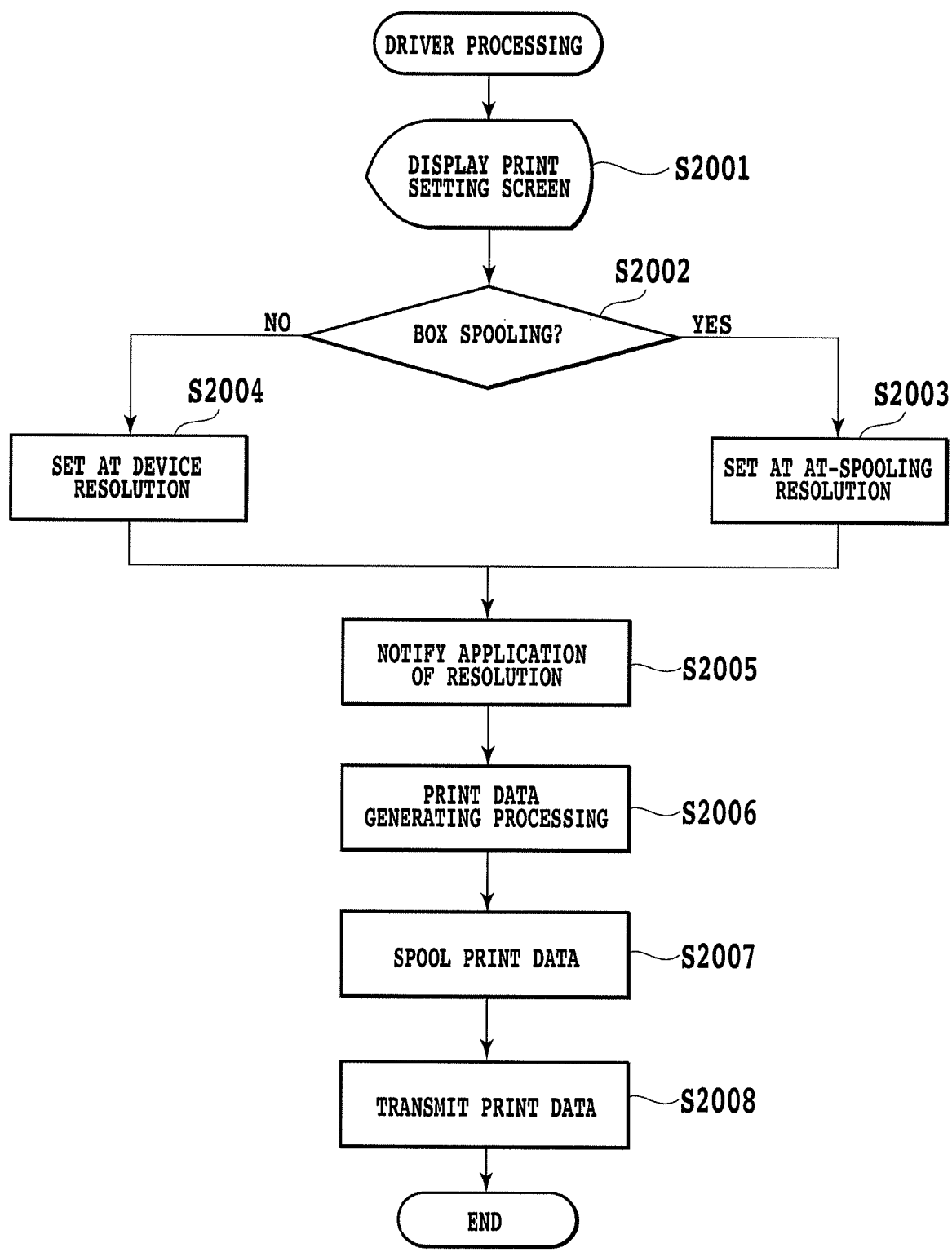
FIG. 20 is a flowchart showing the operation of a printer driver in the embodiment in accordance with the present invention.

Referring to the flowchart of FIG. 20, the operation of the printer driver 1902 will be described which is started when the application program 1901 designates the MFP 1 and assigns printing.

When started, the printer driver 1902 displays a print setting screen on the display unit of the PC 2 (S2001). The user can perform various print settings on the print setting screen such as output paper size and the number of copies output. In addition to the print setting, the user can designate the box spool on the print setting screen. When designating the box spool, the printer driver 1902 displays a screen illustrated in FIG. 21 on the display unit of the PC 2. Incidentally, the box spool refers to functions of retaining (spooling) the print data the printer driver generates in the box of the MFP (storage device such as a HDD), of causing the user to operate on the operating screen the MFP has, and of causing the data retained in the box to be printed out.

Figure 21:
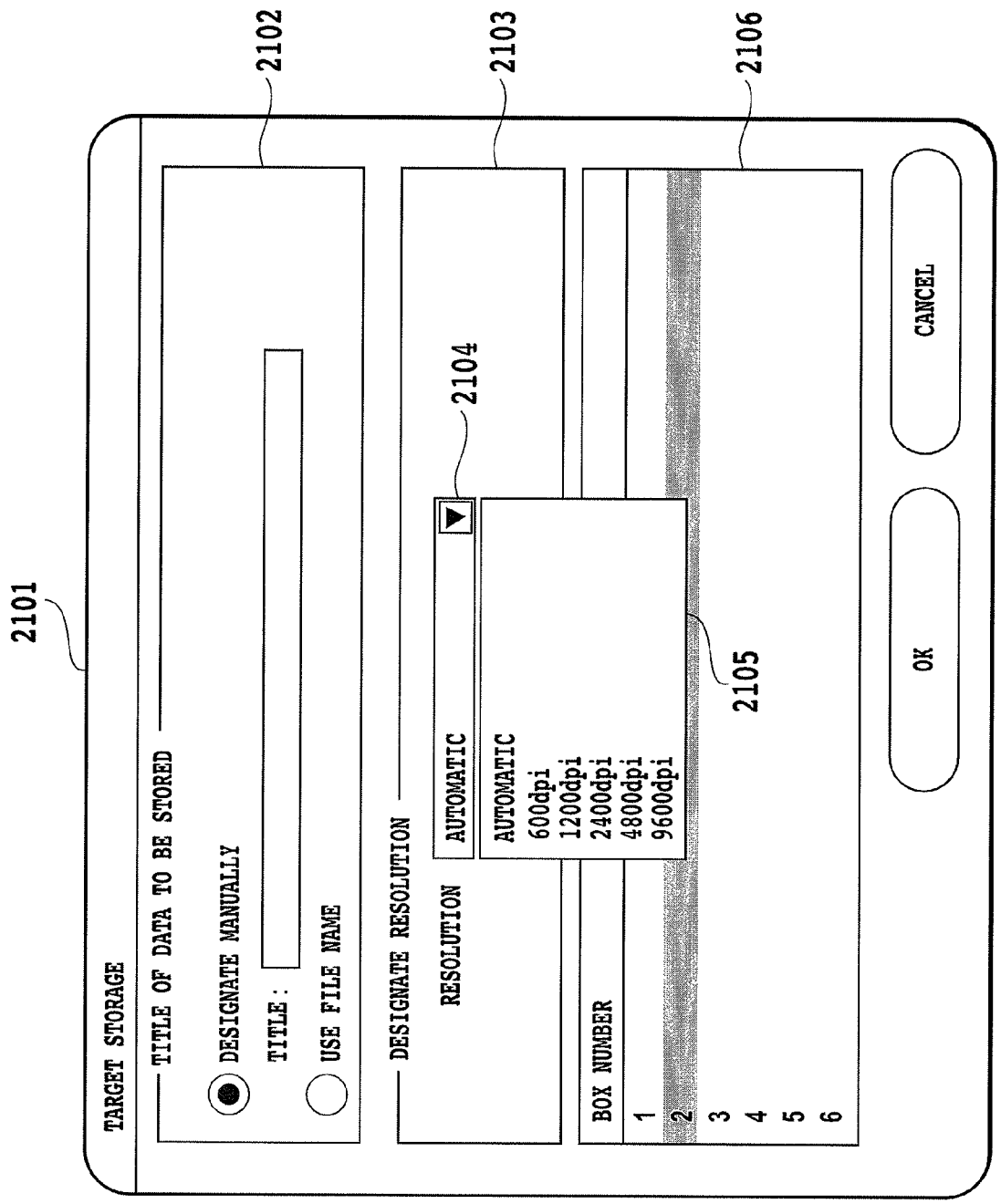
FIG. 21 is a diagram showing an example of a setting screen displayed at designating a box spool in the embodiment in accordance with the present invention.

In FIG. 21, the reference numeral 2101 indicates an example of a screen for setting information such as a target storage, which is displayed on the display unit of the PC 2 at a time of designating the box spool.

In the region denoted by the reference numeral 2102, the user designates the file name of the spooled data.

In the region denoted by the reference numeral 2103, the user designates the resolution at a time of generating the print data generated at the box spool. The resolution can be designated by selecting from the pull-down menu 2105 displayed when clicking a button 2104. Selecting "automatic" on the pull-down menu 2105 means to use the at-spooling resolution set in the MFP 1. In addition, candidates of the resolution displayed in the pull-down menu 2105 can be made dependent on the "user set value priority" setting set in the MFP 1. When the "user set value priority" setting is "ON", the candidates of the resolution is displayed up to the maximum resolution (36800 dpi, for example) the application 1901 or driver 1902 capable of processing. In contrast, when the "user set value priority" setting is "OFF", it displays up to the maximum resolution in the resolutions of the individual devices on the LAN 10, which have been acquired in the foregoing resolution information acquiring processing of the MFP 1. As for the at-spooling resolution, the set value of the "user set value priority", and the maximum resolution the resolution information acquiring processing has acquired and the like information of the MFP 1, they can be obtained by inquiring of the MFP 1. Alternatively, when acquiring the maximum resolution, the PC 2 can inquire of the individual devices directly about the output resolutions, and extract from the results of the inquiry.

The region denoted by the reference numeral 2106 is a region for designating the box number for spooling.

To set the box spool at S2001, the printer driver 1902 acquires the resolution at the time of creating the print data at the box spool in accordance with the user input acquired on the display screen shown in FIG. 21.

When the user issues a printing instruction via the input operating unit of the PC 2 after completing the print setting on the print setting screen, the printer driver 1902 makes a decision at S2002 as to whether the box spool or normal printing is designated. When the box spool is designated, the printer driver 1902 sets at S2003 the data processing resolution at the resolution set by the user at S2001.

For example, at S2001, when the "automatic" is selected on the pull-down menu 2105, the printer driver 1902 sets the at-spooling resolution set in the MFP 1 as the data processing resolution. Alternatively, when a specific resolution is designated on the pull-down menu 2105, The printer driver 1902 sets the specifically designated resolution as the data processing resolution.

When the foregoing "automatic" is selected, the data processing resolution is set at the at-spooling resolution acquired by making an inquiry at the MFP 1. However, as shown in FIG. 23, there are cases where the at-spooling resolution is set in the "automatic" or set at a specific resolution.

As will be described later, when the at-spooling resolution is set automatically, the at-spooling resolution becomes the maximum resolution in the output resolutions of the individual devices on the LAN 10, which have been acquired in the foregoing resolution information acquiring processing, and the data processing resolution also becomes the maximum resolution. The present embodiment carries out the resolution dependent processing using the maximum resolution in the output resolutions of all the image forming devices connected to the network, which are likely to become the output target at the vector data generating stage in the image processing device. More specifically, the image processing device (PC 2 or the like) determines the data processing resolution in such a manner as to correspond to the greatest output resolution among the image forming devices which are likely to be used as output. Thus, in all the image forming devices which are likely to serve as the output, the resolution used for creating the print data at the print data creating stage can be made equal to or greater than the resolution used by the image forming device, thereby being able to generate the vector data with reduced deterioration.

When a specific resolution is set as the at-spooling setting, the specific resolution becomes the data processing resolution. Thus, in the present embodiment, the PC 2 can execute the resolution dependent processing using the resolution set in a specific numerical value as the at-spooling resolution in the MFP 1. Accordingly, at the stage of creating the print data, the resolution used for creating the print data in the MFP 1 which is the output target image forming device can be matched to the processing resolution of the MFP 1, thereby being able to generate the vector data with reduced deterioration.

When the normal printing is designated at S2002, the printer driver 1902 sets the data processing resolution at the output resolution of the MFP 1, that is, at 1200 dpi at S2004. Incidentally, when a decision is made at S2002 that the normal printing is set, the printer driver 1902 can inquire of the MFP 1 designated for printing about the output resolution of the MFP 1, and acquire the output resolution. In the present embodiment, a method is not essential by which the PC 2 acquires the output resolutions of the devices (image forming devices) connected to the network such as the MFP 1, but it is important that the PC 2 retains the output resolution at the prescribed operation. Thus, as for the acquiring timing and acquiring method of the output resolution of other devices such as the MFP 1 connected to the network, any method can be employed such as that the PC 2 inquires at the individual devices or the user inputs via the operating input unit.

At S2005, the printer driver 1902 notifies the application program 1901 of the data processing resolution set at S2003 or S2004. The application program 1901 generates data necessary for printing by utilizing the notified data processing resolution when performing resolution dependent processing such as linearization processing. The application program 1901 can convert the bitmap data to resolution independent vector data.

In the present specification, the term "data processing resolution" refers to the resolution used by a device serving as the input device. In the foregoing explanation, since the PC 2 is the input device, the resolution used in the individual data processing of the PC 2 becomes the data processing resolution.

At S2006, the printer driver 1902 generates the print data (PDL data) by applying various filtering processing to the data the application program 1901 generates.

When the application program 1901 generates a Bezier curve as the vector data here, the linearization processing (resolution dependent processing) utilizing the data processing resolution is executed.

In addition, when the data designating printing of the text data is specified, suitable font data is selected from the high resolution font and low resolution font data by referring to the data processing resolution, and is incorporated into the print data. Besides, at a time of generating the print data, the data processing resolution is recorded as attribute information. More specifically, the printer driver 1902, when executing the resolution dependent processing, carries out the processing of placing the resolution information about the set data processing resolution into the print data generated. Thus, as will be described later, the MFP 1 that receives the print data can recognize the data processing resolution of the sender by analyzing the resolution information contained in the print data.

Incidentally, when the "automatic" is selected in the pull-down menu 2105 and when the at-spooling resolution is set as the data processing resolution, information indicating that the "automatic" is selected is placed into the resolution information about the data processing resolution set. In addition, when a specific resolution is selected in the pull-down menu 2105 and the specific resolution is set as the data processing resolution, information indicating the resolution is placed into the resolution information.

In this way, when the printer driver 1902 carries out, at a time of generating the print data, the resolution dependent processing (linearization processing or the like, for example) which is likely to generate resolution dependent data, the printer driver 1902 generates the print data by executing the resolution dependent processing in accordance with the data processing resolution set.

At S2007, the printer driver 1902 spools the print data (PDL data) generated at S2006 in the print data spooler 1903.

At S2008, the printer driver 1902 successively transmits the print data spooled in the data spooler 1903 to the MFP 1 via the data output unit 1904 and completes the processing.

(Data Processing of Controller Unit)

Next, a way of generating the vector data, DL (Display List) and metadata constituting the document in the MFP 1 will be described.

Figure 9:
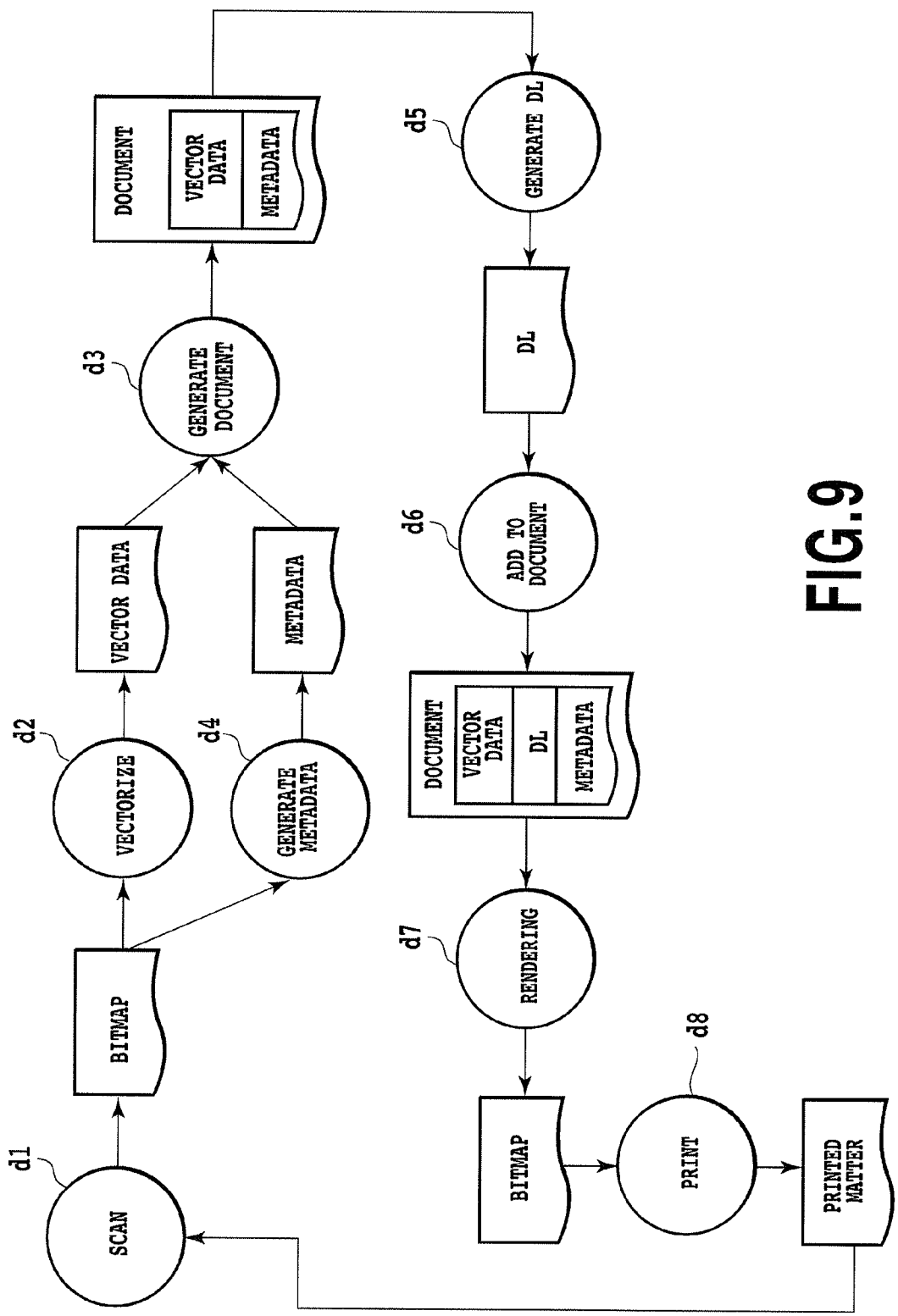
FIG. 9 is a data flow of a copy operation in the embodiment in accordance with the present invention.
Figure 10:
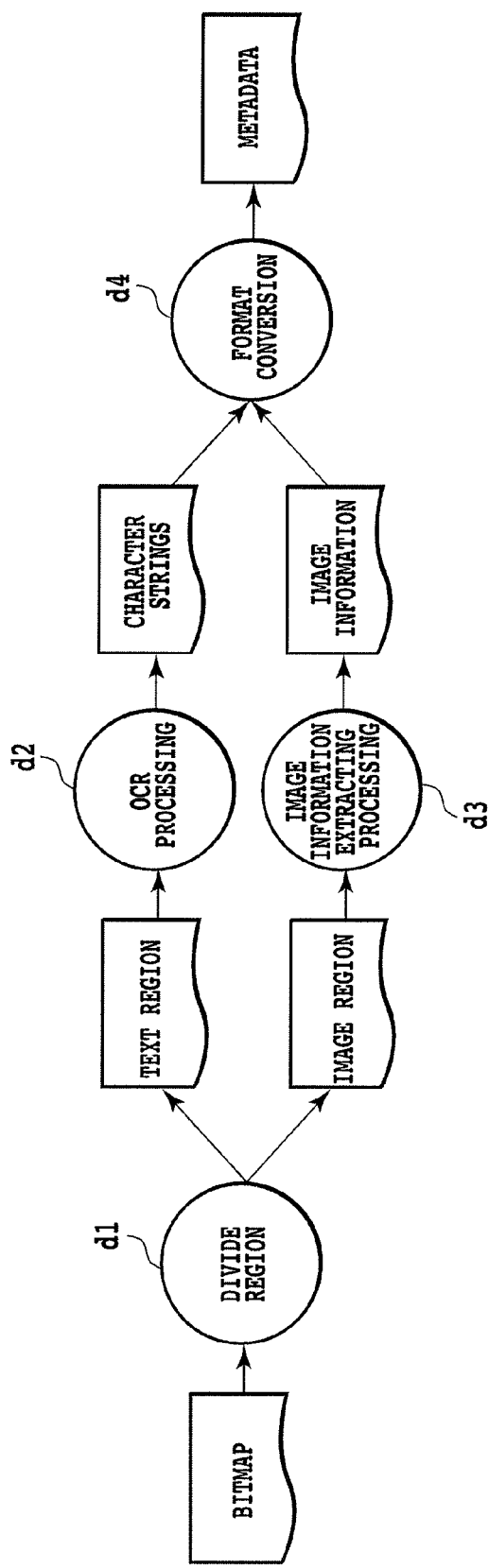
FIG. 10 is a data flow at metadata generation in the embodiment in accordance with the present invention.
Figure 11:
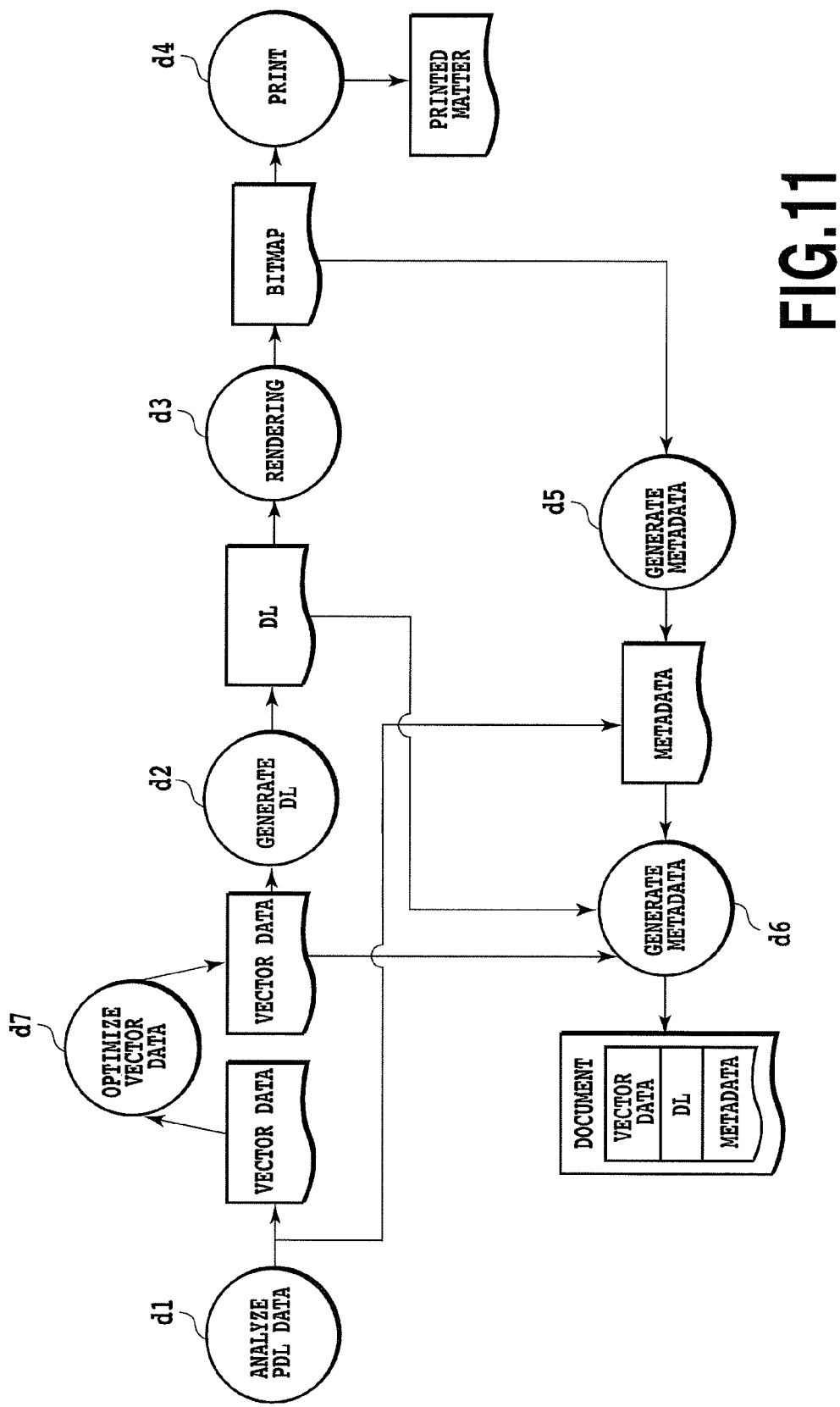
FIG. 11 is a data flow at PDL printing/spooling in the embodiment in accordance with the present invention.

FIG. 9, FIG. 10 and FIG. 11 each show a data flow of the control unit in the present embodiment.

FIG. 9 is a data flow at copy operation.

First, scanning processing d1 converts a paper document set on a document exposure unit to bitmap data. Next, vectorizing processing d2 and metadata generating processing d4 generate resolution independent vector data and metadata annexed thereto from the bitmap data, respectively. A concrete generating method of the vector data and metadata will be described later.

Subsequently, document generating processing d3 generates a document associating the vector data with the metadata. Subsequently, DL generating processing d5 generates the DL from the vector data in the document. The generated DL is stored in the document and at the same time delivered to rendering processing d7 to be developed into a bitmap.

The developed bitmap is recorded on a paper medium by printing processing d8 to become a printed matter. Incidentally, setting the output printed matter on the document exposure unit makes it possible to carry out the processing beginning from the scanning processing d1 again.

FIG. 10 shows a concrete data flow of the metadata generating processing d4 shown in FIG. 9. First, region dividing processing d1 performs region division of the bitmap.

The term region division refers to processing of analyzing the input bitmap image data, divides it into regions on a group by group basis of the objects included in the image, and classifies by deciding the attributes of the individual regions. As the attributes, there are several types such as text (TEXT), photo (PHOTO), line (LINE), picture (PICTURE) and table (TABLE).

Figure 12:
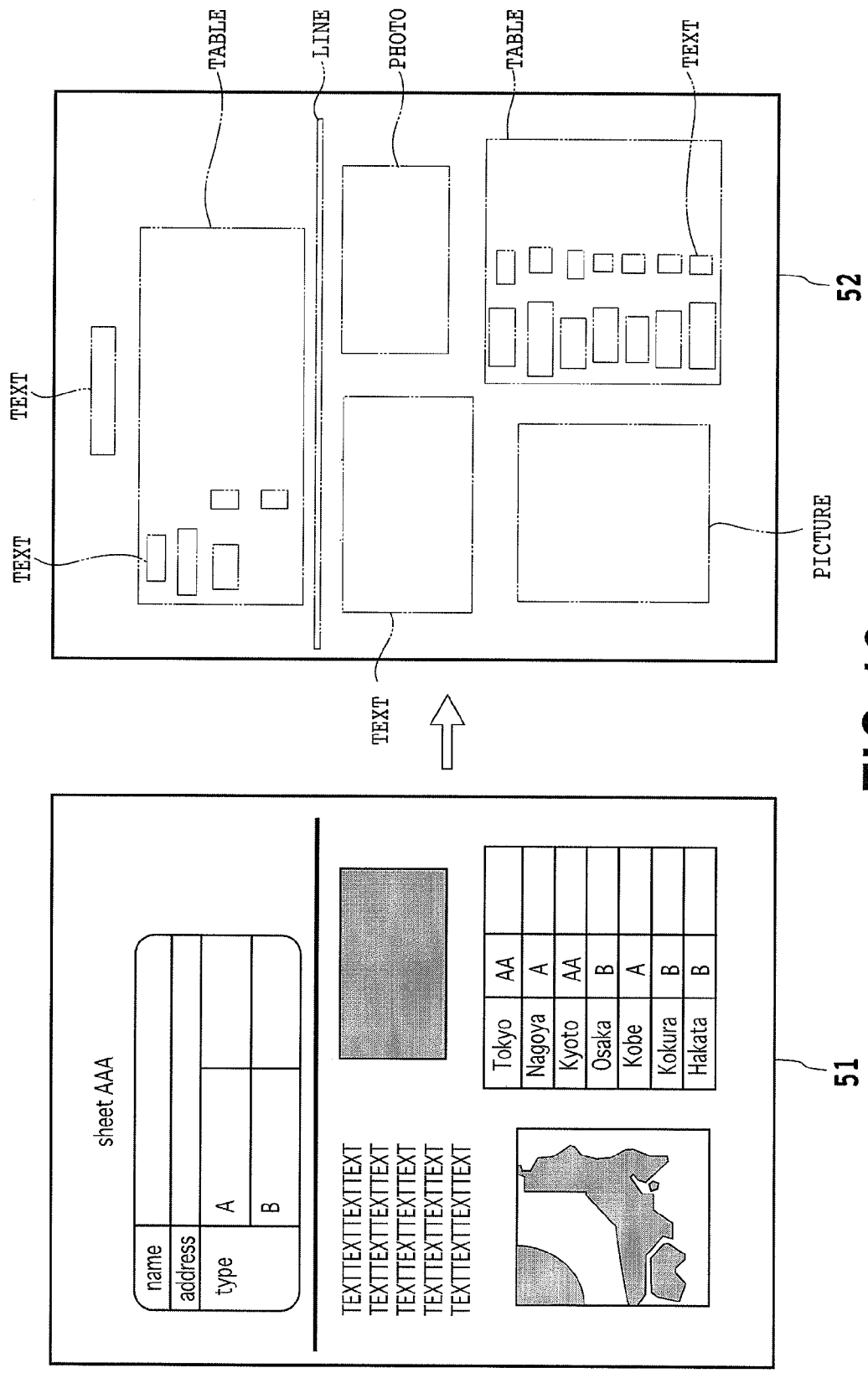
FIG. 12 is a diagram showing an example of a block selection in the vectorizing processing in the embodiment in accordance with the present invention.

FIG. 12 shows an example of performing the region division on the input image. A decision result 52 is a result of performing the region division on the input image 51. In the decision result 52, dotted boxes represent units of the objects obtained as a result of analyzing the image, and the types of the attributes attached to the individual objects are decision results of the region division.

As for the regions with the text attribute among the regions classified in accordance with the attributes, OCR processing d2 performs character recognition processing on them and converts to character strings. Accordingly, the character strings are character strings printed on the sheet.

On the other hand, as for the regions with the photo attribute among the regions classified in accordance with the attributes, image information extracting processing d3 converts them to image information. The image information is a character string representing a feature of a photo such as "flower" or "face". To extract the image information, general image processing techniques such as image feature detection (detection of the frequency or density of pixels constituting an image) and face recognition can be used.

The character strings and image information generated are arranged into a data format which will be described later by format conversion processing d4, and the metadata is generated.

FIG. 11 is a data flow at a time of PDL (Page Description Language) printing/spooling. The PDL printing/spooling refers to operation that receives a page description language (PDL) the application software on the PC or the printer driver generates, and carries out print output or box spool. As shown in FIG. 20, the designation of the printing or box spool can be made using the application or printer driver at the time of generating the PDL data.

First, PDL data analyzing processing d1 analyzes the received PDL data and generates the vector data. The vector data is optimized by optimization processing d7.

Subsequently, DL generating processing d2 generates DL from the optimized vector data. The generated DL is stored in the document and delivered to rendering processing d3 to be developed into a bitmap. When the print output is designated by the printer driver, the developed bitmap is recorded on a paper medium by printing processing d4 and becomes a printed matter.

On the other hand, when the box spool is instructed by the printer driver, document generating processing d6 stores the optimized vector data and DL in the document.

Furthermore, from the bitmap the rendering processing d3 generates, the metadata generating processing d5 described in connection with FIG. 10 generates the character strings and image information as the metadata in the same manner as in the copy operation, and stores in the document.

Although the PDL includes various types such as LIPS (LBP Image Processing System (trademark)) and PS (PostScript (trademark)), some of the PDL have character string information. In this case, the metadata is generated from the character strings at the PDL analysis, and is stored in the document.

Next, the document generating processing and printing processing will be described with reference to a flowchart.

Figure 13:
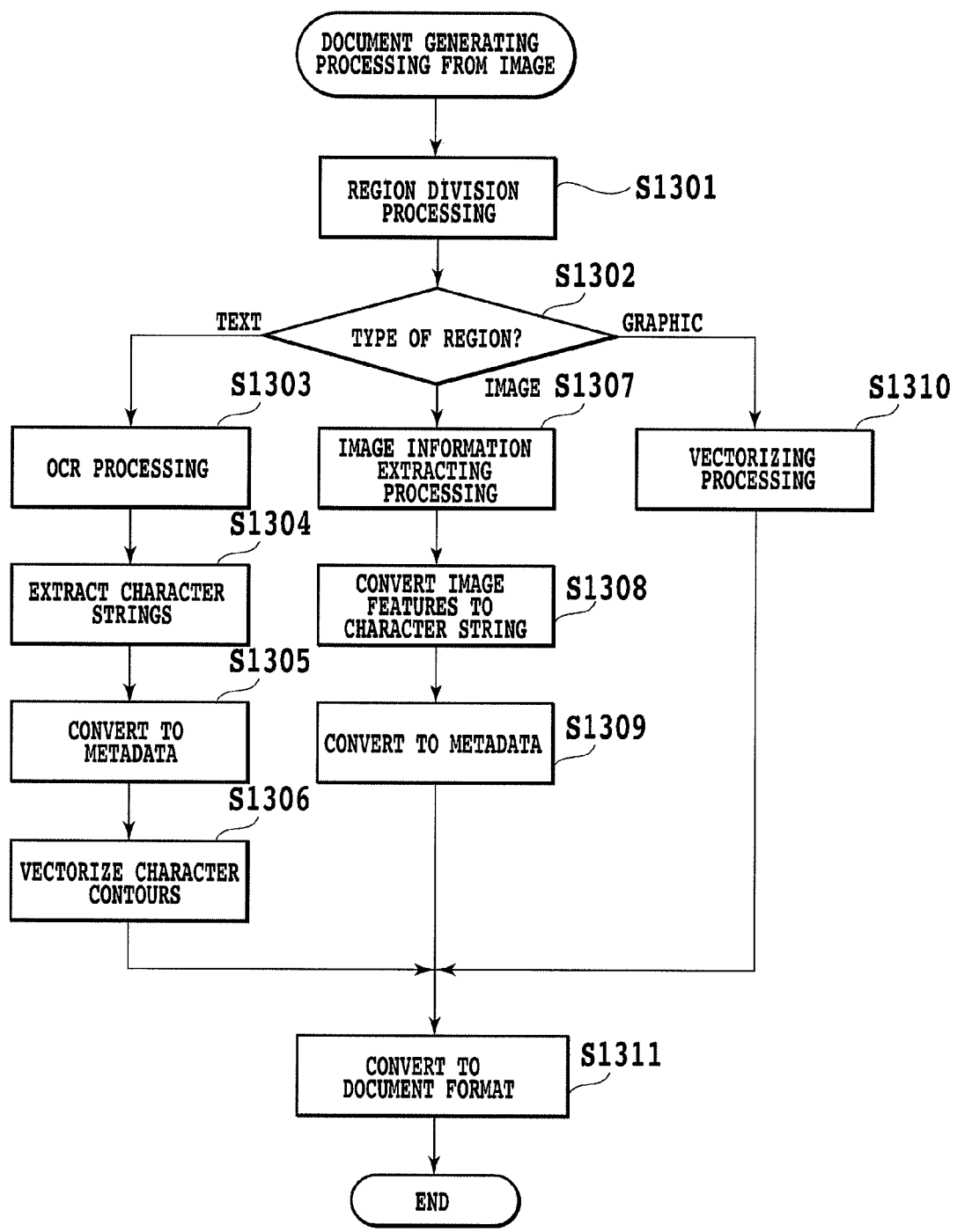
FIG. 13 is a flowchart showing document generating processing from an image in the embodiment in accordance with the present invention.

FIG. 13 shows the document generating processing of the present embodiment. It is processing in the MFP 1, which receives the bitmap data and generates a document composed of the vector data, DL and metadata.

First, at S1301, the MFP 1 performs the foregoing region division processing on the bitmap data acquired. Subsequently, the MFP 1 classifies the types (attributes) of the regions obtained at S1301 into TEXT, GRAPHIC and IMAGE at S1302, and carries out different processing to each of them. Although FIG. 12 shows an example that divides the attributes to TEXT, PHOTO, LINE, PICTURE and TABLE, as for the attributes of FIG. 12, PHOTO and PICTURE are classified into IMAGE and LINE and TABLE are classified to GRAPHIC.

When the region attribute is TEXT, the MFP 1 proceeds to S1303 to execute OCR processing, and then extracts character strings at S1304. After that, MFP 1 converts the character strings to metadata at S1305, and proceeds to S1306 to vectorize character contours recognized, thereby converting them to vector data.

Here, a little more explanation will be added.

Although the metadata generated from the character strings is a list of character codes, the list of the character codes is information necessary for keyword search.

However, although the OCR processing can recognize the character codes, it cannot recognize a typeface such as "Mincho typeface" or "Gothic", character size such as "10 pt" or "12 pt" or text enhancement such as "italic" or "bold". Accordingly, it is necessary for drawing to retain the character contours as the vector data instead of using the character codes.

On the other hand, at S1302, if the region attribute is IMAGE, the MFP 1 proceeds to S1307 to execute the image information extracting processing.

At S1307, the MFP 1 detects image features using a general image processing technique such as image feature detection and face recognition as described before. Subsequently, the MFP 1 proceeds to S1308 to convert the features of the image detected to character strings. The conversion is easy as long as tables of feature parameters and character strings are retained.

After that, at S1309, the MFP 1 converts the character strings passing through the conversion at S1308 to metadata.

As for the region attribute of IMAGE, vectorizing is not performed, and thus the image data is retained as the vector data without being processed.

At S1302, if the region attribute is GRAPHIC, the MFP 1 proceeds to S1310 to execute vectorizing processing.

Figure 14:
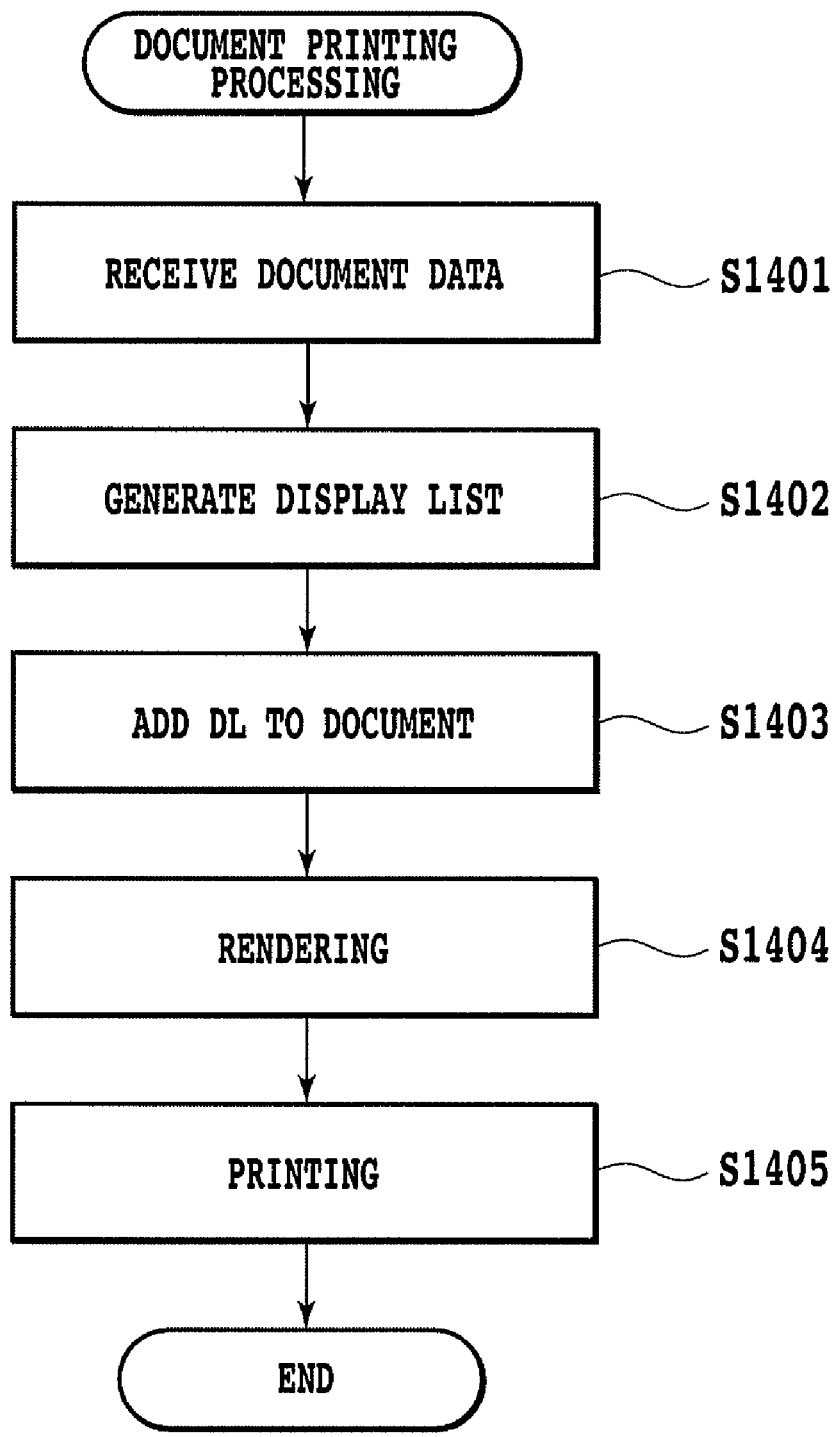
FIG. 14 is a flowchart showing document printing processing in the embodiment in accordance with the present invention.

FIG. 14 shows the document printing processing in the MFP 1. It is processing for printing out the generated document. There are some cases where it prints document data sent from an external device.

First, at S1401, the MFP 1 acquires the document data used as print data, and generates DL from the vector data in the document at S1402. Subsequently, at S1403, the MFP 1 adds the generated DL to the document, and renders the DL to a bitmap at S1404. Finally, at S1405, the MFP 1 executes the printing processing onto a paper medium and completes the processing.

Figure 15B:
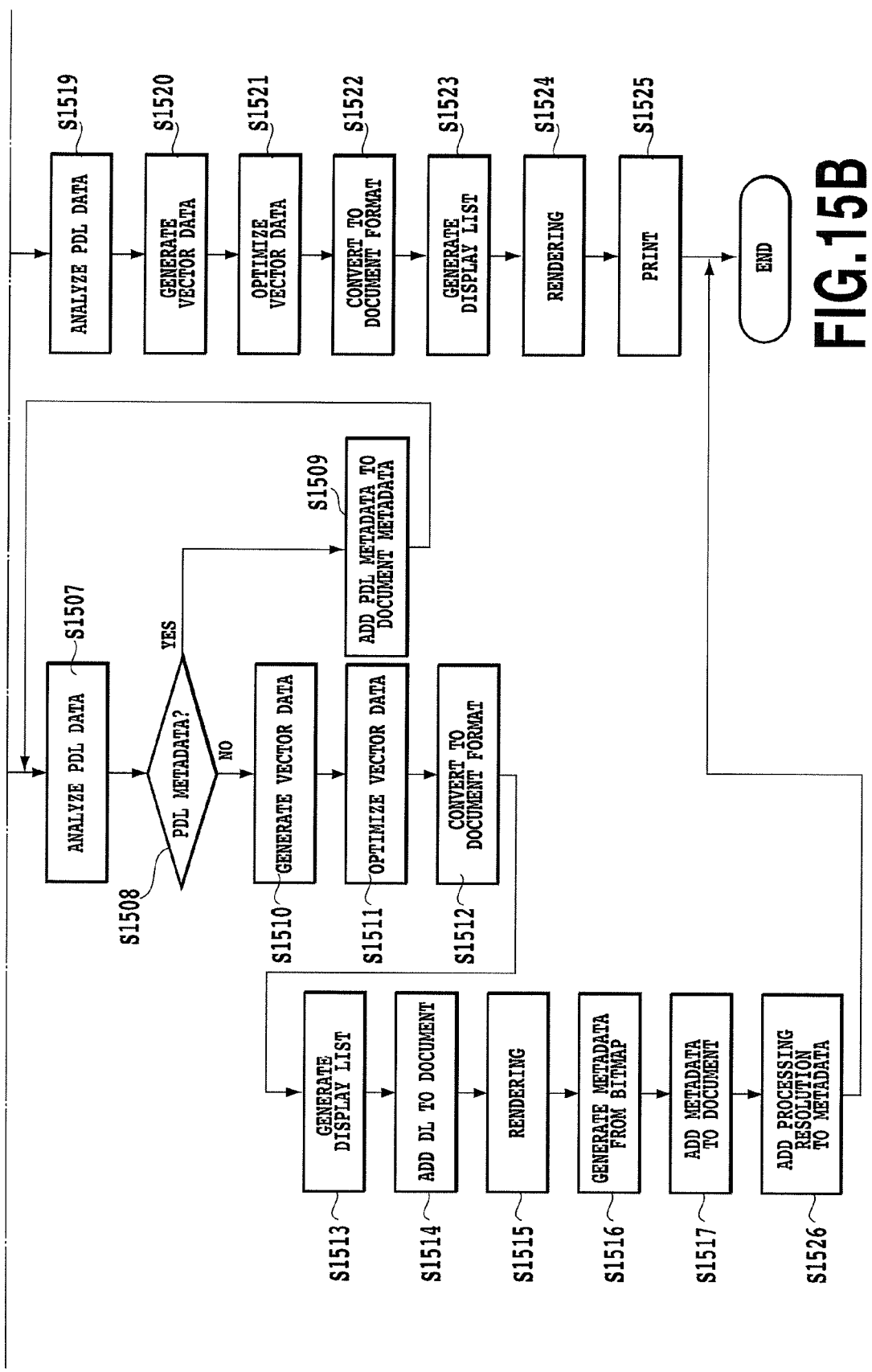

FIGS. 15A and 15B show document generating/printing processing from a PDL. It is processing that receives PDL data (print data) transmitted from the PC 2, and causes the MFP 1 capable of spooling the vector data to generate and print out the document. More specifically, receiving the print data including the resolution information about the data processing resolution from the PC 2, the MFP 1 executes the following processing.

First, at S1501, the MFP 1 analyzes the PDL data serving as the input print data, which is input from the PC 2, makes a decision as to whether the PDL data relates to a box spool job or a printing job, and proceeds to S1502 if it relates to a box spool job, and to S1518 if it relates to a printing job.

At S1502, the MFP 1 analyzes the PDL data, and makes a decision as to whether or not the resolution information on the data processing resolution includes information designating a specific resolution or information indicating that "automatic" is selected. More specifically, it makes a decision as to whether the data processing resolution is set in the printer driver 1902 or not by checking whether the PDL data includes the information indicating the specific resolution on the data processing resolution. If the data processing resolution is set, that is, if the information indicating that the specific resolution is included, the processing proceeds to S1503, and unless it is set, that is, if the information indicating that "automatic" is selected is included, the processing proceeds to S1504.

At S1503, the MFP 1 sets the processing resolution, which is the resolution used when performing the resolution dependent processing in the MFP 1, to the data processing resolution included in the PDL data. Thus, when creating the PDL data, the MFP 1 can execute the resolution dependent processing at the resolution the PC 2, the creator of the PDL data, uses at the time of the resolution dependent processing.

At S1504, since a decision is made at S1502 that the processing resolution is set at the at-spooling resolution, the MFP 1 checks the "at-spooling resolution" setting in the box specification setting set by the user in FIG. 23, and makes a decision as to whether the "at-spooling resolution" setting is "automatic" or not. As a result of the decision, if the "at-spooling resolution" setting is "automatic", the processing proceeds to S1505, and unless the "at-spooling resolution" setting is "automatic", the processing proceeds to S1506.

At S1505, the MFP 1 sets the processing resolution to the maximum resolution in the output resolutions of the individual devices on the LAN 10 the MFP 1 acquires in the resolution information acquiring processing.

At S1506, the MFP 1 sets the processing resolution to the specific resolution that has been set at the "at-spooling resolution".

At S1507, the MFP 1 analyzes the PDL data. At S1508, the MFP 1 makes a decision as to whether the PDL data includes the metadata or not, and if it is found during the analysis that the PDL data includes the metadata such as character string information, it proceeds to S1509 to add the information in the PDL to the metadata. In addition, in the PDL data analysis, if Bezier curve data is found during the analysis, the MFP 1 executes the linearization processing by referring to the processing resolution. Furthermore, if an internal font is designated in the text processing of the PDL data, the MFP 1 selects the high resolution font or low resolution font using the resolution information. In addition, the font scaling processing also refers to the resolution information.

On the other hand, as for the data other than the metadata like the character string information obtained as a result of the analysis at S1507, the MFP 1 converts the data to the vector data at S1510. In the present embodiment, although the MFP 1 converts the vector data created by the PC 2 to the vector data of an MFP 1 format, even if the print data from the PC 2 includes the resolution dependent data, the MFP 1 can process the data at the resolution capable of reducing the definition deterioration.

At S1511, the MFP 1 performs the optimization processing of the vector data which will be described later. At S1512, the MFP 1 converts the optimized vector data to a document.

Subsequently, at S1513, the MFP 1 generates the DL, and proceeds to S1514 to add the generated DL to the document.

Furthermore, the MFP 1 renders the DL at S1515 to generate a bitmap, generates metadata from the generated bitmap at S1516, and adds the metadata to the document at S1517.

At S1526, the MFP 1 adds the processing resolution to the metadata.

Up to this step of the flow, the document is generated and spooled in the box designated.

On the other hand, when the PDL data relates to the printing job, the MFP 1 sets at S1518 the processing resolution to the output resolution of the MFP 1, and proceeds to S1519.

At S1519, the MFP 1 analyzes the PDL data. The PDL data analysis carries out, if it includes the Bezier curve data, linearization processing on referring to the processing resolution. In addition, the PDL data analysis selects, if the text processing of the PDL data designates the internal font, the high resolution font or low resolution font using the resolution information. In addition, the scaling processing of the font refers to the resolution information as well.

On the other hand, at S1520, the MFP 1 converts the drawing object obtained as a result of the PDL data analysis to vector data.

At S1521, the MFP 1 carries out the optimization processing of the vector data which will be described later. At S1522, the MFP 1 converts the optimized vector data to a document.

Subsequently, the MFP 1 generates a DL at S1523, and generates a bitmap by rendering the DL at S1524.

At S1525, the MFP 1 prints the bitmap generated on a paper medium, and completes the printing processing of the PDL.

Figure 24:
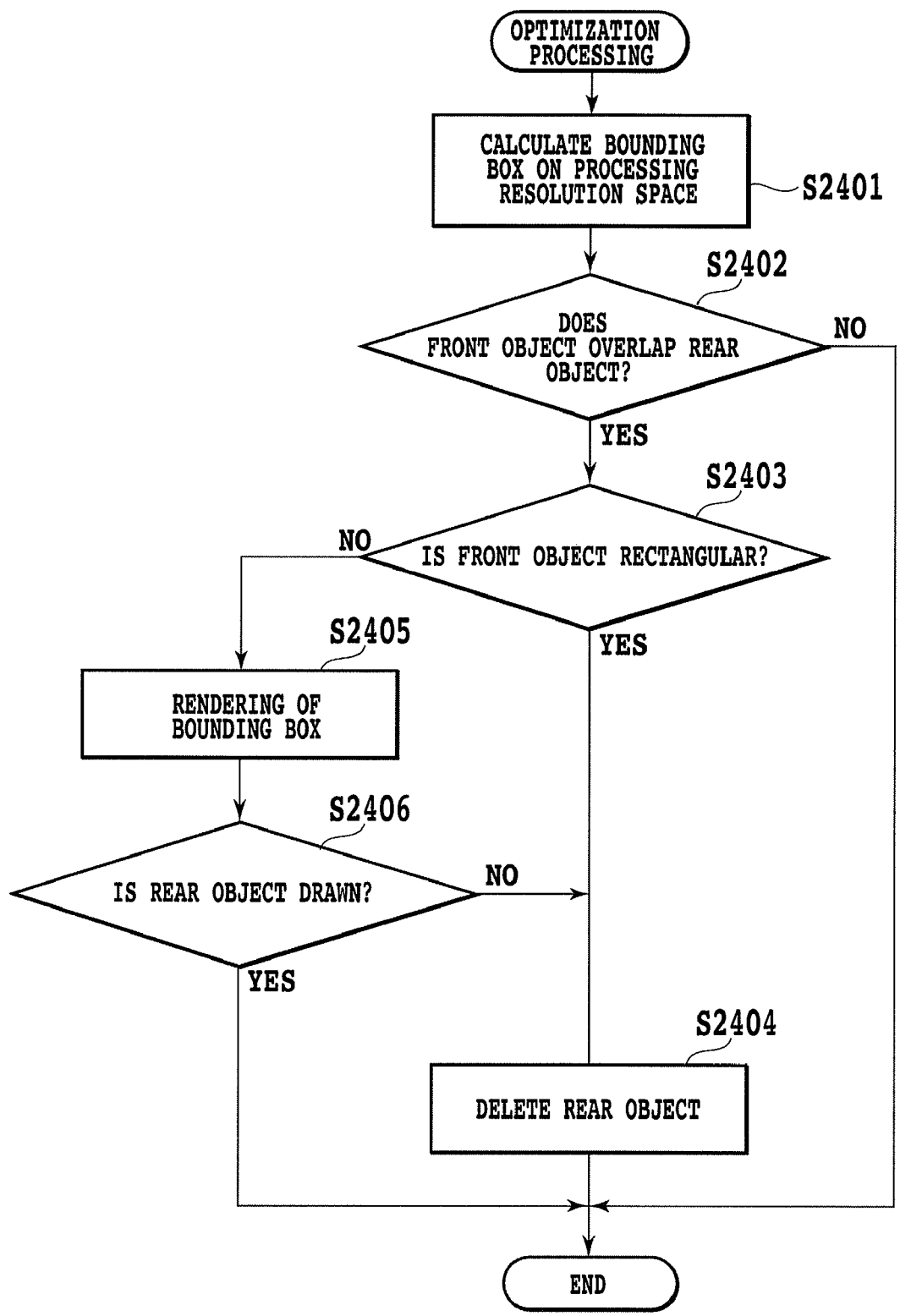
FIG. 24 is a flowchart showing an example of vector data optimum processing in the embodiment in accordance with the present invention.

FIG. 24 shows an example of the optimization processing of the vector data at S1511 and S1521.

The optimization processing is performed for each object of the vector data. The processing target object becomes a front object.

At S2401, the MFP 1 converts the drawing object of the target vector data to processing resolution space, and then calculates a bounding box.

Next, at S2402, the MFP 1 compares the bounding box of the front object with the bounding box of a rear object, and checks the presence or absence of a completely overlapped rear object. Here, the term "completely overlapped" includes a case of complete agreement. When there is a completely overlapped rear object, the processing proceeds to S2403, and if there is not any completely overlapped rear object, the processing is terminated.

At S2403, the MFP 1 checks whether the front object is a rectangle or not. If it is a rectangle, it proceeds to S2404 to delete the rear object. Here, if the front object is a rectangle, since the bounding box completely agrees with the drawing object, the rear object is completely covered with the front object.

On the other hand, unless the front object is a rectangle, the MFP 1 carries out at S2405 the rendering processing of the bounding box region of the front object at the processing resolution. After that, at S2406, the MFP 1 checks whether part of the rear object is drawn in the rendering result or not.

Unless the rear object is drawn in the rendering result, the MFP 1 deletes the rear object at S2404 and completes the processing. On the other hand, if the rear object is drawn, it completes the optimization processing without being treated.

Figure 25A:
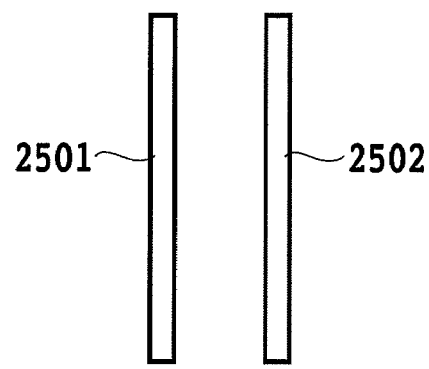
FIGS. 25A-25C are diagrams showing an example of the vector data optimum processing in the embodiment in accordance with the present invention.
Figure 25B:
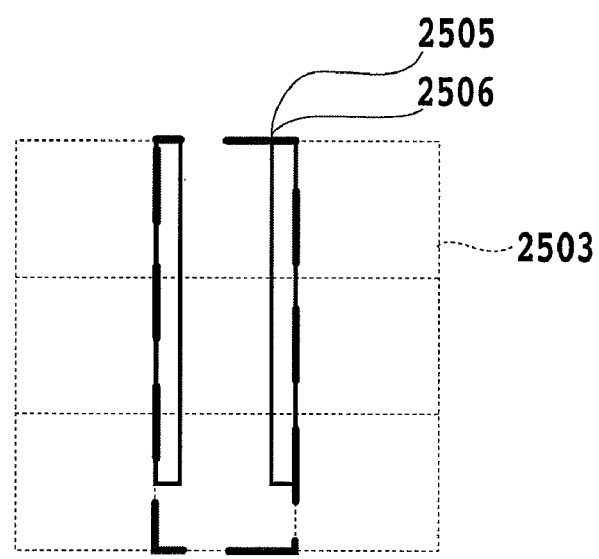
Figure 25C:
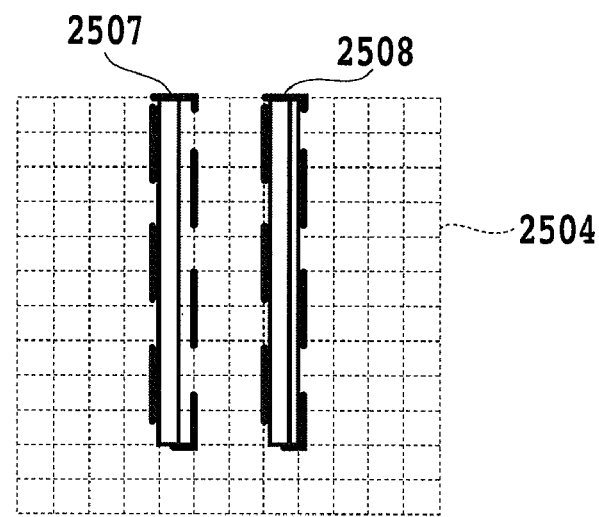

FIGS. 25A-25C show an example of the optimization processing.

FIG. 25A shows the optimization target vector data. As the drawing objects of the vector data, there are two objects denoted by the reference numerals 2501 and 2502. FIG. 25B shows an example when the processing resolution is 600 dpi, and FIG. 25C is an example when the processing resolution is 2400 dpi. The reference numeral 2503 and reference numeral 2504 denote pixel boundaries of the respective processing resolutions. The reference numeral 2505 and reference numeral 2506 each denote the bounding box of the drawing object 2501 and 2502 on the 600 dpi space. In the example of FIG. 25B, the bounding boxes agree with each other completely, and since they are a rectangle, the drawing object 2502 is deleted. On the other hand, the reference numeral 2507 and reference numeral 2508 each denote a bounding box on the 2400 dpi space. In the example of FIG. 25C, since the bounding boxes do not overlap, the drawing objects are not deleted.

(Document Data Structure)

Next, a structure of a document will be described.

Figure 16:
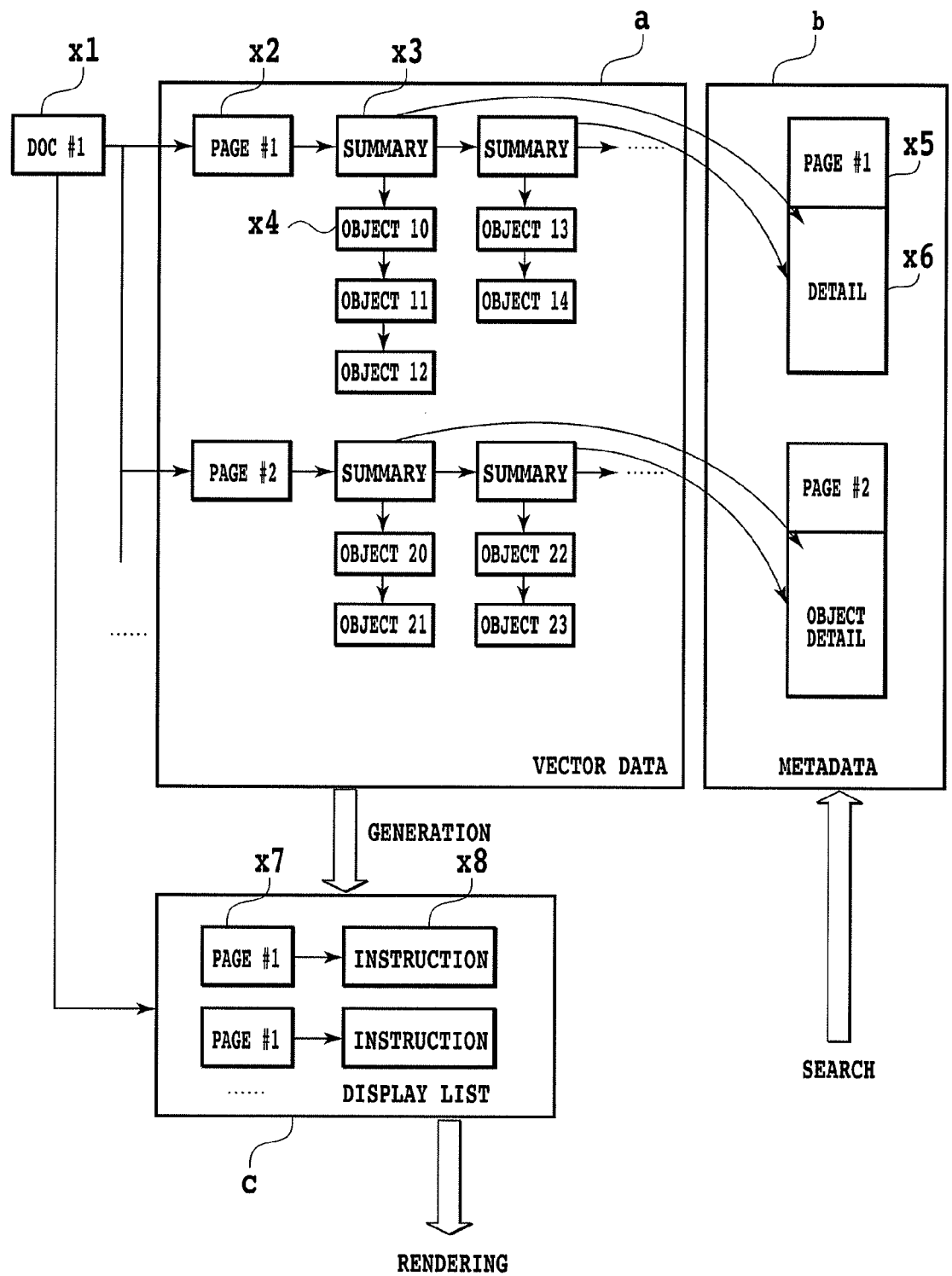
FIG. 16 is a diagram showing a data structure of a document in the embodiment in accordance with the present invention.
Figure 17:
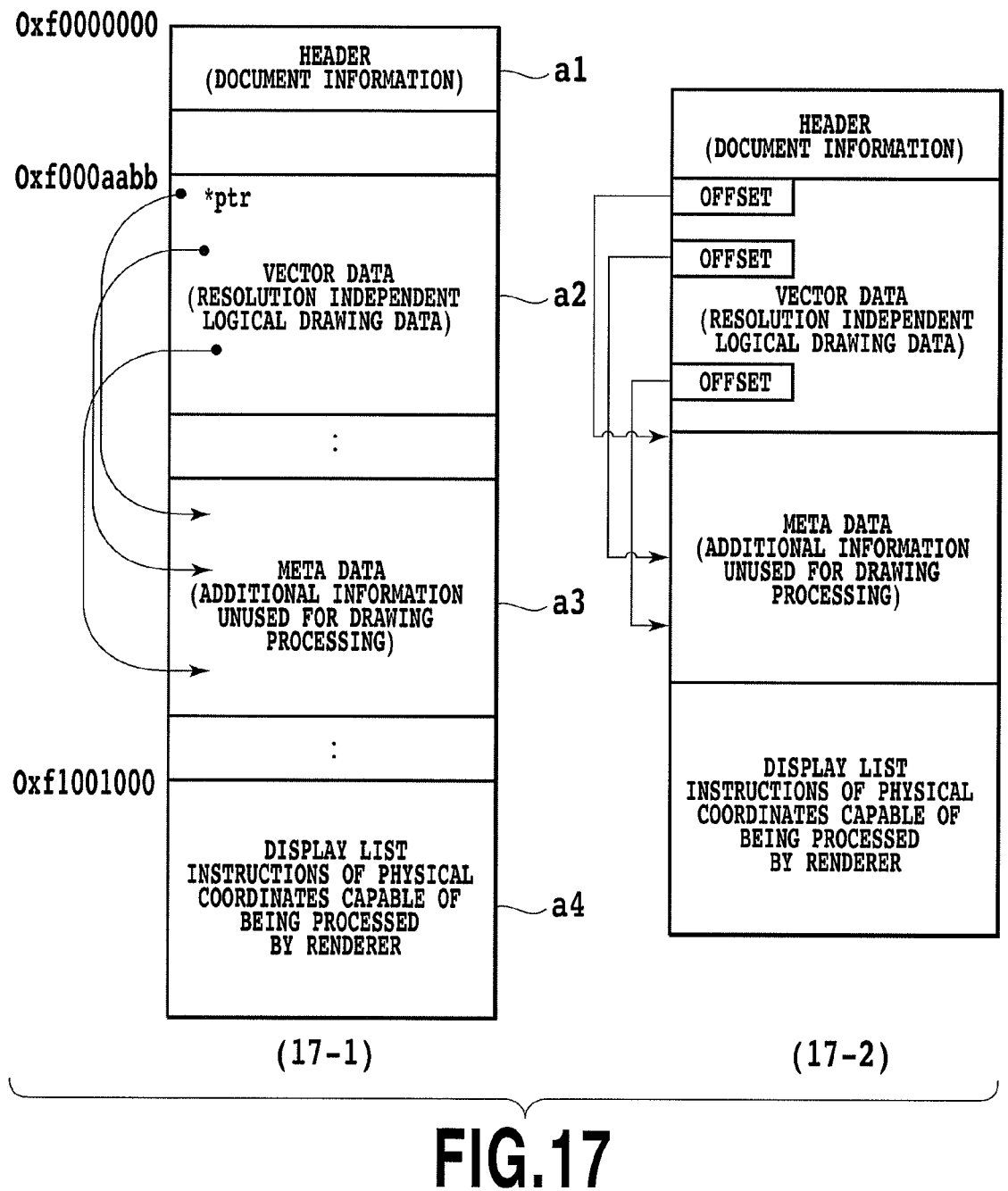
FIG. 17 is a diagram showing a storage structure of a document in the embodiment in accordance with the present invention.
Figure 18:
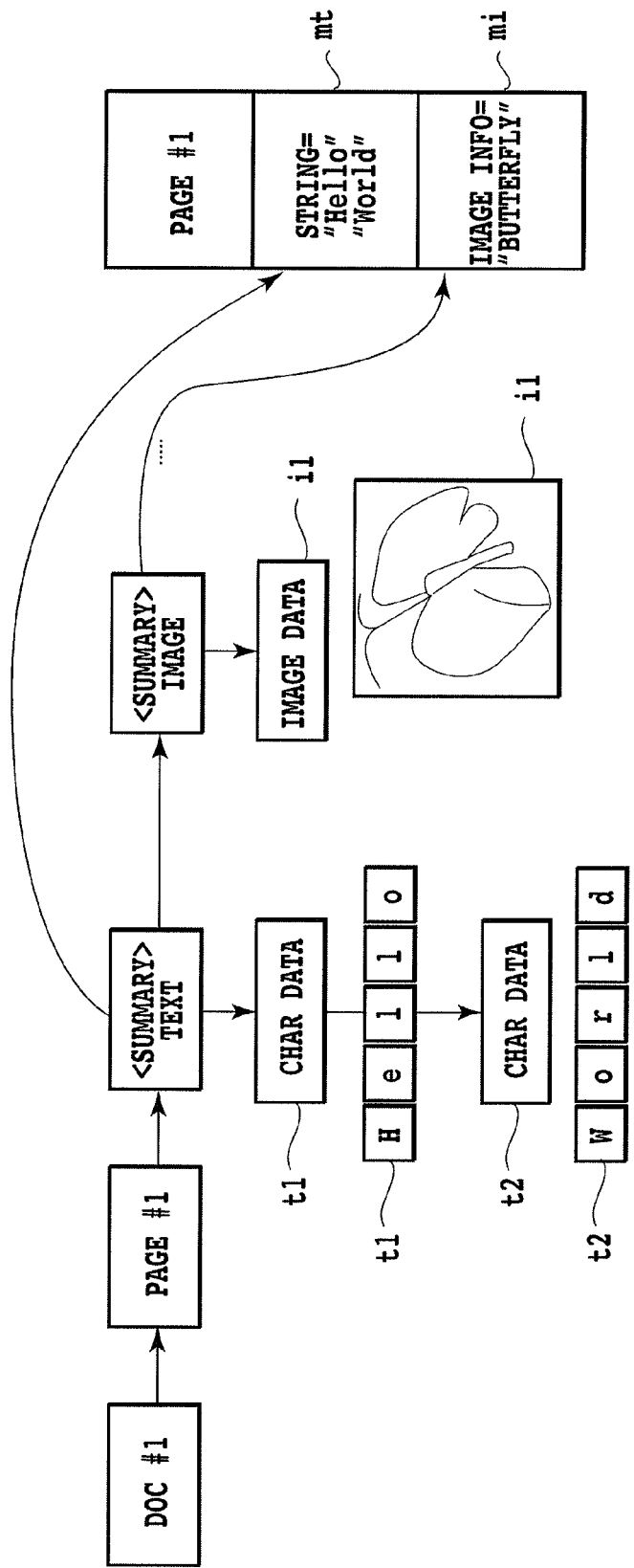
FIG. 18 is a diagram showing a concrete example of document data in the embodiment in accordance with the present invention.

FIG. 16, FIG. 17 and FIG. 18 show a structure of a document of the present embodiment.

FIG. 16 is a diagram showing a data structure of a document of the present embodiment.

The document, which consists of data on a plurality of pages, is roughly divided into components of vector data (a), metadata (b) and DL (c), and has a hierarchical structure beginning from a document header (x1). The vector data (a) is further composed of a page header (x2), summary information (x3), and objects (x4). The metadata (b) is further composed of page information (x5) and detailed information (x6). The DL (c) is further composed of a page header (x7) and instructions (x8) for developing a drawing. Since the document header (x1) describes the storage location of the vector data and the storage location of the DL, the vector data and the DL are linked by the document header (x1).

Since the vector data (a) is resolution independent drawing data, the page header (x2) describes layout information such as the magnitude and direction of a page. To the object (x4), each of the drawing data such as a line, polygon and Bezier curve is linked, and the plurality of objects are linked to the summary information (x3) collectively. The summary information (x3), which expresses the characteristics of the plurality of objects collectively, describes the attribute information on the divided regions explained in FIG. 12.

The metadata (b) is additional information used for search unrelated to the drawing processing. The page information (x5) region includes page information as to whether the metadata is generated from the bitmap data or from the PDL data, or as to which resolution it is created at, for example. In addition, the detailed information (x6) describes character strings (character code strings) generated as OCR information or image information.

The summary information (x3) of the vector data (a) refers to the metadata so that the summary information (x3) can find the detailed information (x6).

The DL (c) is intermediate code to be developed into a bitmap by the renderer. The page header (x7) describes a management table of drawing information (instructions) within a page or the like, and the instructions (x8) are composed of resolution dependent drawing information.

FIG. 18 is a diagram showing a concrete example of the document data of the present embodiment.

The summary information on a first page has "TEXT" and "IMAGE". The "TEXT" summary information has character contours of H, e, l, l, o (object t1) and W, o, r, l, d (object t2) linked thereto as the vector data.

In addition, the summary information refers to the character code strings (metadata mt) of "Hello" and "World".

The "IMAGE" summary information has a photographic image (JPEG) of a butterfly linked thereto.

In addition, the summary information refers to the image information (metadata mi) of "butterfly".

Accordingly, to search the text on the page using "World" as a keyword, for example, the following procedure can be used for the search. First, the vector page data is successively acquired from the document header, and the summary information linked to the page header is searched for the metadata linked to "TEXT".

FIG. 17 is a diagram showing layouts of the data structure described in FIG. 16 on the memory and file.

As designated by the reference numeral 17-1, as for the document, the vector data region, metadata region, and DL region are located at any desired addresses on the memory.

As designated by the reference numeral 17-2, as for the document, the vector data region, metadata region, and DL region are serialized in a single file.

(Document Information Display)

The reference numeral 2601 of FIG. 26 designates an example of a screen displaying details of the document data spooled in the box.

A user can cause the operating unit 210 to display the detailed information about the document data by selecting the document from the box by operating the operating unit 210. The screen displays the receipt number (ID), receipt time, document name, document type, user name, page number, processing resolution at spool of the document.

The receipt number, an ID uniquely assigned when the document is generated, has its information in the metadata. The receipt time, the time the document is generated, can be acquired from the generating time of the document stored in a file. The document name is a file name of the document stored in the file. The document type indicates information as to whether the document data is generated from scanning data (bitmap data) or from PDL data. When the document data is generated from the PDL data, it further displays information as to which application the PDL data is generated from. These items of information are contained in the metadata.

The page number is the number of pages contained in the document.

The at-spooling designated resolution is information about the processing resolution used at the time when the vector data in the document is generated. In this manner, the MFP 1 stores the processing resolution set at step S1503 or S1504 of FIG. 15A in connection with the vector data generated in the MFP 1 as the at-spooling designated resolution. Thus, the MFP 1 can display on the operating unit 210 the prescribed vector data and the at-spooling designated resolution associated with the vector data.

The user can estimate the quality in which the document is printed out from the information about the at-spooling designated resolution displayed.

As described above, according to the present embodiment, when the application or printer driver on the host executes the resolution dependent processing and when the box spool is designated, print output is generated at the resolution designated by the user or at the maximum resolution of the printing devices on the network. In addition, the resolution dependent processing in the PDL processing on the MFP 1 also applies the resolution designated by the user or the maximum resolution of the printing devices on the network. This makes it possible to obtain a printout of the quality the user wishes or of the highest quality even when outputting the document data with a low output resolution, which is spooled in the box of the MFP, from a printing device with a high resolution.

On the other hand, the resolution used for optimizing the vector data is limited to the resolution designated by the user or to the maximum resolution of the printing devices on the network. This enables the vector data to exclude unnecessary objects, thereby being able to prevent an increase in the data size and a decline in the processing rate at the print output.

Second Embodiment (System Configuration)

Figure 27:
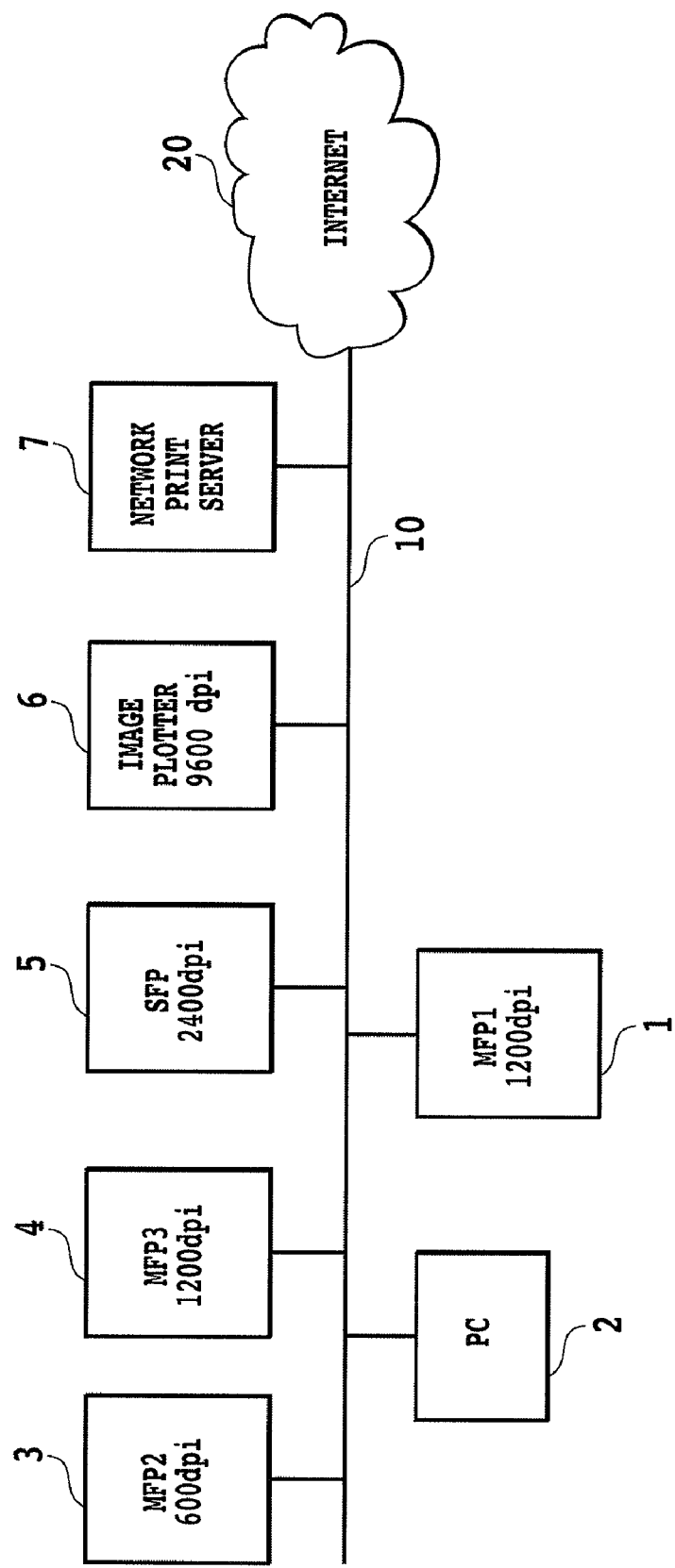
FIG. 27 is a block diagram showing a whole configuration of an image processing system in an embodiment in accordance with the present invention.

FIG. 27 is a block diagram showing a whole configuration of an image processing system of the present embodiment. The present embodiment has, besides the image processing system of FIG. 6, a network print server 7 added thereto, and the LAN 10 is connected to the Internet 20 via a router not shown. In the present embodiment, the PC 2 functions as a first image processing device, and the network printer server 7 functions as a second image processing device.

The network print server 7 has a CPU, central processing unit, for controlling the whole server. In addition, the network print server 7 has a RAM serving not only as a system working memory for the CPU of the server to operate, but also as an image memory for temporarily storing the input image data, and a ROM that stores the boot program of the system. Furthermore, the network print server 7 has a hard disk for storing system software for various processing, input image data and the like. Moreover, the network print server 7 has an input operating unit including a keyboard or various switches for inputting prescribed instructions or data, and a display unit for carrying out a variety of display such as input/set states of the device.

The network print server 7 appears to be an output device capable of printing out the document data (vector data) from the individual devices on the LAN 10 just as the MFP or SFP. Receiving the document data from the individual devices on the LAN 10, the network print server 7 spools it in an internal file system. The document data spooled in the file system has a structure accessible from the individual devices on the Internet 20 so that the document data is redistributed in response to a request from the printing devices on the Internet.

The network print server 7 has a configuration enabling a manager to set the resolution for making a response to an inquiry about the resolution in accordance with an SNMP (Simple Network Management Protocol).

Thus, in response to the inquiry about the resolution from the MFP 1 or the like on the LAN 10, the resolution set by the manager is notified. Accordingly, the individual devices on the LAN 10 handle the network print server 7 as an output device of the document data with the output resolution set by the manager.

Incidentally, although it is assumed that the manager sets the resolution of the network print server 7 for making a response to an inquiry about the resolution according to the SNMP, it is also possible to set it at the maximum resolution of the devices on the Internet to which the document data is distributed.

As described above, according to the present embodiment, it can generate the optimum vector data considering not only the output devices connected on the LAN 10, but also the output devices on the Internet.

Other Embodiments

The present invention is applicable not only to a system consisting of a plurality of devises (such as a computer, interface unit, reader, and printer), but also to an apparatus consisting of a single device (such as a multifunction machine, printer or fax machine).

A processing method that stores in a storage medium a program for operating the configurations of the foregoing embodiments in such a manner as to implement the functions of the foregoing embodiments, and that reads the program stored in the storage medium as code, and causes a computer to execute it also falls within the category of the foregoing embodiments. Thus, the computer readable storage medium also falls within the scope of the embodiments. In addition, not only the storage medium that stores the foregoing computer program, but also the computer program itself also falls within the scope of the foregoing embodiments.

As the storage medium, a floppy (registered trademark) disk, hard disk, optical disk, magneto-optical disk, CD-ROM, magnetic tape, nonvolatile memory card, and ROM can be used.

In addition, not only the single program stored in the foregoing storage medium to execute the processing, but also a program that operates on an OS in conjunction with other software and/or functions of an expansion board to execute the operation of the foregoing embodiments also falls within the category of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-173343, filed Jul. 2, 2008, which is hereby incorporated by reference herein in its entirety.

What is claimed is:

1. An image processing device for generating vector data from print data to spool the vector data, the image processing device comprising:
   a computer-readable memory constructed to store computer-executable process steps; and
   a processor constructed to execute the computer-executable process steps stored in the memory;
   wherein the process steps stored in the memory cause the processor to:
   receive the print data;
   decide whether a process for the received print data relates to a printing process or a spooling process;
   set an at-spooling resolution;
   determine a processing resolution as i) an output resolution of the image processing device, when the printing process is decided, ii) the at-spooling resolution, when the spooling process is decided and a value of the at-spooling resolution is set, and iii) an output resolution of a device having a maximum resolution in a network to which the image processing device is connected, when the spooling process is decided and a value of the at-spooling resolution is not set; and
   convert the print data to the vector data based on the determined processing resolution.

2. The image processing device according to claim 1, wherein the process steps stored in the memory further cause the processor to:
   store the processing resolution in association with the vector data; and
   display the vector data and the processing resolution associated with the vector data.

3. The image processing device according to claim 1, wherein the vector data is generated based on the determined processing resolution by executing a linearization processing of Bezier curve in the print data.

4. An image processing method for generating vector data from print data to spool the vector data, the image processing method comprising:
   a receiving step of receiving the print data;
   a processing deciding step of deciding whether a process for the received print data relates to a printing process or a spooling process;
   an at-spooling resolution setting step of setting an at-spooling resolution;
   a processing resolution determining step of determining a processing resolution as i) an output resolution of the image processing device, when the printing process is decided by the processing deciding step, ii) the at-spooling resolution, when the spooling process is decided by the processing deciding step and a value of the at-spooling resolution is set by the at-spooling resolution setting step, and iii) an output resolution of a device having a maximum resolution in a network to which the image processing device is connected, when the spooling process is decided by the processing deciding step and a value of the at-spooling resolution is not set by the at-spooling resolution setting step; and
   a processing step of converting the print data to the vector data based on the processing resolution determined by the processing resolution determining step.

5. A non-transitory computer readable storage medium that stores a program causing a computer to execute an image processing method for generating vector data from print data to spool the vector data, the computer readable storage medium causing the computer to execute:
   a receiving step of receiving the print data;
   a processing deciding step of deciding whether a process for the received print data relates to a printing process or a spooling process;
   an at-spooling resolution setting step of setting an at-spooling resolution;
   a processing resolution determining step of determining a processing resolution as i) an output resolution of the image processing device, when the printing process is decided by the processing deciding step, ii) the at-spooling resolution, when the spooling process is decided by the processing deciding step and a value of the at-spooling resolution is set by the at-spooling resolution setting step, and iii) an output resolution of a device having a maximum resolution in a network to which the image processing device is connected, when the spooling process is decided by the processing deciding step and a value of the at-spooling resolution is not set by the at-spooling resolution setting step; and
   a processing step of converting the print data to the vector data based on the processing resolution determined by the processing resolution determining step.

* * * * *